United States Patent
Abdoli et al.

(10) Patent No.: US 11,832,089 B2
(45) Date of Patent: *Nov. 28, 2023

(54) SYSTEMS AND METHODS FOR MULTICAST RESOURCE ALLOCATION

(71) Applicant: Huawei Technologies Co., Ltd., Shenzhen (CN)

(72) Inventors: Javad Abdoli, Kanata (CA); Keyvan Zarifi, Ottawa (CA); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

This patent is subject to a terminal disclaimer.

(21) Appl. No.: 17/349,184

(22) Filed: Jun. 16, 2021

(65) Prior Publication Data

US 2021/0314738 A1  Oct. 7, 2021

Related U.S. Application Data

(63) Continuation of application No. 16/687,226, filed on Nov. 18, 2019, now Pat. No. 11,070,951.

(Continued)

(51) Int. Cl.
*H04W 4/06* (2009.01)
*H04L 1/00* (2006.01)
(Continued)

(52) U.S. Cl.
CPC .............. *H04W 4/06* (2013.01); *H04L 1/0061* (2013.01); *H04L 5/001* (2013.01); *H04L 5/0092* (2013.01);
(Continued)

(58) Field of Classification Search
CPC ..... H04W 4/06; H04W 76/11; H04W 72/005; H04W 72/30; H04L 1/0061; H04L 5/001; H04L 5/0092
See application file for complete search history.

(56) References Cited

U.S. PATENT DOCUMENTS

| 2011/0085513 | A1* | 4/2011 | Chen | H04W 72/23 |
| | | | | 370/330 |
| 2011/0230219 | A1* | 9/2011 | Shores | H04W 28/26 |
| | | | | 455/507 |

(Continued)

FOREIGN PATENT DOCUMENTS

| CN | 108934075 A | 12/2018 |
| WO | 2018097680 A1 | 5/2018 |
| WO | 2018203727 A1 | 11/2018 |

OTHER PUBLICATIONS

Qualcomm Incorporated, "Remaining Issues on DL/UL Resource Allocation", 3GPP TSG-RAN WG1 Meeting #93, R1-1807363, May 21-25, 2018, 14 Pages, Busan, Korea.

(Continued)

*Primary Examiner* — Jael M Ulysse
(74) *Attorney, Agent, or Firm* — Slater Matsil, LLP

(57) ABSTRACT

A method for a multicast service is provided. In this example, the method includes receiving, by a user equipment (UE), a control format including a resource allocation field from a base station (BS), the resource allocation field indicating a starting resource block (RB) index and an RB range, obtaining a set of RBs allocated for a multicast physical downlink shared channel (PDSCH) or physical uplink shared channel (PUSCH) based on a starting RB location and the RB range; wherein the starting RB location is associated with the starting RB index and at least one of a reference RB location or an assigned sub-band; and transmitting or receiving, by the UE, data over at least one RB of the set of RBs allocated for the multicast PDSCH or PUSCH.

20 Claims, 14 Drawing Sheets

Related U.S. Application Data

(60) Provisional application No. 62/806,436, filed on Feb. 15, 2019.

(51) Int. Cl.

| | |
|---|---|
| *H04L 5/00* | (2006.01) |
| *H04W 80/08* | (2009.01) |
| *H04W 76/11* | (2018.01) |
| *H04W 72/23* | (2023.01) |
| *H04W 72/30* | (2023.01) |

(52) U.S. Cl.
CPC ........... *H04W 72/23* (2023.01); *H04W 72/30* (2023.01); *H04W 76/11* (2018.02); *H04W 80/08* (2013.01)

(56) References Cited

U.S. PATENT DOCUMENTS

| | | | | |
|---|---|---|---|---|
| 2012/0014330 | A1* | 1/2012 | Damnjanovic | H04L 5/001 370/329 |
| 2012/0250642 | A1* | 10/2012 | Qu | H04W 24/10 370/329 |
| 2013/0070708 | A1* | 3/2013 | Bai | H04W 72/23 370/329 |
| 2013/0176952 | A1* | 7/2013 | Shin | H04W 72/23 370/329 |
| 2014/0269595 | A1* | 9/2014 | Lee | H04W 72/23 370/329 |
| 2015/0063231 | A1* | 3/2015 | Seo | H04L 5/0044 370/329 |
| 2015/0208208 | A1* | 7/2015 | You | H04W 72/30 370/312 |
| 2015/0282036 | A1* | 10/2015 | Yi | H04L 5/0048 370/332 |
| 2015/0282208 | A1* | 10/2015 | Yi | H04W 72/23 370/329 |
| 2015/0295689 | A1* | 10/2015 | Lee | H04L 5/001 370/329 |
| 2016/0128037 | A1* | 5/2016 | Park | H04L 5/001 370/312 |
| 2016/0338011 | A1 | 11/2016 | Mizusawa | |
| 2017/0195999 | A1* | 7/2017 | Feng | H04W 76/27 |
| 2017/0230956 | A1* | 8/2017 | Kim | H04L 5/0032 |
| 2017/0290016 | A1* | 10/2017 | Yi | H04W 72/0453 |
| 2017/0303241 | A1* | 10/2017 | Yang | H04L 5/0053 |
| 2018/0131493 | A1* | 5/2018 | Luo | H04L 5/0007 |
| 2018/0145818 | A1* | 5/2018 | Choi | H04L 5/005 |
| 2018/0160409 | A1* | 6/2018 | Park | H04W 76/10 |
| 2018/0220422 | A1* | 8/2018 | Bhattad | H04W 72/0453 |
| 2018/0279229 | A1* | 9/2018 | Dinan | H04W 74/0833 |
| 2018/0343154 | A1 | 11/2018 | Park et al. | |
| 2019/0021045 | A1* | 1/2019 | Kim | H04W 48/12 |
| 2019/0110290 | A1* | 4/2019 | Sun | H04W 24/08 |
| 2019/0149380 | A1* | 5/2019 | Babaei | H04W 72/0446 370/330 |
| 2019/0158332 | A1* | 5/2019 | Akkarakaran | H04L 1/1887 |
| 2019/0215807 | A1* | 7/2019 | Hwang | H04L 5/00 |
| 2019/0239198 | A1* | 8/2019 | Zhang | H04W 72/23 |
| 2020/0120642 | A1* | 4/2020 | Hwang | H04W 72/04 |
| 2020/0120680 | A1* | 4/2020 | Hwang | H04L 1/00 |

OTHER PUBLICATIONS

LG Electronics, "Remaining details on search space", 3GPP TSG RAN WG1 Meeting 91, R1-1719918, Nov. 27-Dec. 1, 2017, 4 Pages, Reno, USA.

Fujitsu, "Corrections to PDSCH mapping", 3GPP TSG RAN WG1 Meeting #72, R1-130104, Jan. 28-Feb. 1, 2013, 5 pages, St Julian's, Malta.

* cited by examiner

SYSTEMS AND METHODS FOR MULTICAST RESOURCE ALLOCATION

CROSS-REFERENCE TO RELATED APPLICATIONS

This application is a continuation of U.S. application Ser. No. 16/687,226 filed on Nov. 18, 2019, now U.S. Pat. No. 11,070,951 issued on Jul. 20, 2021, entitled "Systems and Methods for Multicast Resource Allocation," which claims priority to U.S. Provisional Patent Application No. 62/806,436, filed on Feb. 15, 2019, entitled "Systems and Methods for Multicast Resource Allocation," both of which applications are hereby incorporated by reference herein in their entireties.

TECHNICAL FIELD

The present invention relates to wireless communications, and, in particular embodiments, to systems and methods for multicast resource allocation.

BACKGROUND

Downlink control information (DCI) formats are communicated over a physical downlink control channel (PDCCH) to notify user equipments (UEs) of physical downlink shared channel (PDSCH) or physical uplink shared channel (PUSCH) resource grants. Techniques for reducing overhead when communicating PDSCH resource grants over the PDCCH are needed to satisfy the performance requirements of long term evolution (LTE) and fifth generation (5G) new radio (NR) wireless standards.

In current 5G network system, there are two DCI formats for scheduling data in DL and two DCI formats for scheduling data in UL. An example is DCI format 1_0, known as fallback DCI for DL. If it is monitored in a common search space (CSS), the size of its frequency domain resource assignment (FDRA) field is given by the size of CORESET 0 if CORESET 0 is configured for the cell and the size of initial DL bandwidth part if CORESET 0 is not configured for the cell. But DCI format 1_0 does not support BWP switching and cross-carrier scheduling, thus can be used for scheduling PDSCH in the active BWP. Another example is DCI format 0_0, known as fallback DCI for UL. If it is monitored in a common search space (CSS), the size of its FDRA field is given by the size of the initial UL bandwidth part. But DCI format 0_0 does not support BWP switching and cross-carrier scheduling. Another example is DCI format 1_1, known as non-fallback DCI for DL. It is monitored in UE-specific search space and the size of FDRA field is given by the active DL BWP. DCI format 1_1 can support BWP switching and cross-carrier scheduling. Another example is DCI format 0_1, known as non-fallback DCI for UL. It is monitored in UE-specific search space and the size of FDRA field is given by the active UL BWP. DCI format 0_1 can support BWP switching and cross-carrier scheduling. All the above 5G DCI formats do not support multicast scheduling with BWP switching or cross-carrier scheduling, and thus, a new DCI format design and resource allocation mechanism will be needed.

SUMMARY OF THE INVENTION

Technical advantages are generally achieved by embodiments of this disclosure which describe systems and methods for multicast resource allocation.

According to one aspect of the present disclosure, a method for a multicast service is provided, wherein the method includes receiving, by a user equipment (UE), a control format including a resource allocation field from a base station, the resource allocation field indicating a starting resource block (RB) index and an RB range; obtaining a set of RBs allocated for a multicast physical downlink shared channel (PDSCH) or physical uplink shared channel (PUSCH) based on a starting RB location and the RB range; wherein the starting RB location is associated with the starting RB index and at least one of a reference RB location or an assigned sub-band; and transmitting or receiving, by the UE, data over at least one RB of the set of RBs allocated for the multicast PDSCH or PUSCH.

Optionally, in some embodiments of any of the preceding aspects, the obtaining the set of RBs of the multicast PDSCH or PUSCH comprises: locating a starting RB of the multicast PDSCH or PUSCH based on the starting RB location and the reference RB location; and locating an ending RB of the multicast PDSCH or PUSCH based on the RB range and the starting RB of the multicast PDSCH or PUSCH.

Optionally, in some embodiments of any of the preceding aspects, the obtaining the set of RBs of the multicast PDSCH or PUSCH comprises: locating a starting RB of the multicast PDSCH or PUSCH based on the starting RB location and a starting RB of the assigned sub-band; and locating an ending RB of the multicast PDSCH or PUSCH based on the RB range and the starting RB of the multicast PDSCH or PUSCH.

According to another aspect of the present disclosure, a method for a multicast service is provided, wherein the method includes sending, by a base station, a resource allocation field to a group of UEs, the resource allocation field indicating a starting resource block (RB) index and an RB range; and transmitting or receiving, by the base station, data over at least one RB of a set of RBs in a multicast PDSCH or PUSCH with the group of UEs, wherein a set of RBs of the multicast PDSCH or PUSCH are identified based on a starting RB location and the RB range, and the starting RB location is associated with the starting RB index and at least one of a reference RB location or an assigned sub-band.

Optionally, in some embodiments of any of the preceding aspects, the method further comprising: assigning, by the BS, a multicast group identity (ID) a first UE and a second UE of the group UEs, constructing, by the BS, a control format which includes the resource allocation field, and a Cyclic Redundancy Check (CRC) based on the control format, and scrambling, by the BS, the CRC by the multicast group ID.

Optionally, in some embodiments of any of the preceding aspects, the resource allocation field is signaled based on at least one of: a downlink control information (DCI) for downlink multicast, wherein a size of the resource allocation field can determined in accordance with any one of a size of a common control resource set (CORESET), a size of an initial downlink BWP, a size of a downlink BWP having a smallest BWP ID among a plurality of downlink BWPs configured for a first UE and a second UE; a size of a default downlink bandwidth part (BWP) configured for the first IE and the second UE; a numerology of a current active BWP; or a downlink component carrier within which a control format is transmitted to the first UE and the second UE; a downlink control information (DCI) for uplink multicast, wherein a size of the resource allocation field is determined in accordance with a size of an uplink bandwidth part (BWP), the uplink BWP having a smallest BWP ID among a plurality of uplink BWPs configured for the first UE; or a higher-layer parameter indicating a first plurality of reference RBs comprises the (k×N)-th common RB, k being an integer and N being a pre-determined value.

Optionally, in some embodiments of any of the preceding aspects, the common CORESET is a CORESET with CORESET ID #0 within a carrier where the DCI is received.

Optionally, in some embodiments of any of the preceding aspects, the control format is size-matched to a type 1_0 DCI.

Optionally, in some embodiments of any of the preceding aspects, N is a multiple of a configured RB group size or a configured RB bundle size; or N is determined in accordance with a numerology of an active downlink bandwidth part (BWP).

Optionally, in some embodiments of any of the preceding aspects, the reference RB is assigned to the group UEs by a higher layer signaling, and the reference RB comprises a first plurality of reference RBs comprises a set of common RBs, the set of common RBs are configured by higher layers.

Optionally, in some embodiments of any of the preceding aspects, before the sending the method further comprising: sending, by the BS, a BWP identifier (ID) indicating a first BWP to a first UE and a second BWP to a second UE, and wherein the at least one RB belongs to one of the first BWP and the second BWP.

Optionally, in some embodiments of any of the preceding aspects, the first BWP is different from the second BWP in a same carrier or an aggregation of carriers.

Optionally, in some embodiments of any of the preceding aspects, the at least one RB belonging to the one of the first BWP and the second BWP has a lowest RB index among a first subset of the first plurality of reference RBs, the first subset of the first plurality of reference RBs belonging to the first BWP.

Optionally, in some embodiments of any of the preceding aspects, the set of RBs has a size of one of: an initial downlink bandwidth part (BWP) or an initial uplink BWP configured for a first component carrier; a downlink BWP or an uplink BWP, the downlink BWP or uplink BWP having a smallest BWP ID among a plurality of downlink BWPs or uplink BWPs configured for a first UE within a component carrier; a default downlink bandwidth part (BWP) or a default uplink BWP configured for the first component carrier; or a size in accordance with which a size of the resource allocation field is determined or configured using DCI or a higher layer signaling message.

Optionally, in some embodiments of any of the preceding aspects, the resource allocation field includes a bitmap indicating the at least one RB to be used for the multicast service.

Optionally, in some embodiments of any of the preceding aspects, the at least one RB includes a set of contiguously allocated RBs, and wherein the resource allocation field includes a resource indication value (RIV) corresponding to a starting RB and a length of the set of contiguously allocated RBs.

Optionally, in some embodiments of any of the preceding aspects, the starting RB and the length of the set of contiguously allocated RBs are determined in accordance with the RIV and a scale factor if M is different than N, M being a size of a number of contiguous RBs, N being size in accordance with which a size of the resource allocation field is determined.

According to another aspect of the present disclosure, a device is provided, wherein the device includes: a non-transitory memory storage comprising instructions; and one or more processors in communication with the non-transitory memory storage, wherein the one or more processors execute the instructions to: receive a control format including a resource allocation field from a base station, the resource allocation field indicating a starting resource block (RB) index and an RB range; obtain a set of RBs allocated for a multicast physical downlink shared channel (PDSCH) or physical uplink shared channel (PUSCH) based on a starting RB location and the RB range; wherein the starting RB location is associated with the starting RB index and at least one of a reference RB location or an assigned sub-band; and transmit or receive data over at least one RB of the set of RBs allocated for the multicast PDSCH or PUSCH.

Optionally, in some embodiments of any of the preceding aspects, the instructions to obtain the set of RBs comprise instructions to: locate a starting RB of the multicast PDSCH or PUSCH based on the starting RB location and the reference RB location; and locate an ending RB of the multicast PDSCH or PUSCH based on the RB range and the starting RB of the multicast PDSCH or PUSCH.

Optionally, in some embodiments of any of the preceding aspects, the instructions to obtain the set of RBs comprise instructions to: locate a starting RB of the multicast PDSCH or PUSCH based on the starting RB location and a starting RB of the assigned sub-band; and locate an ending RB of the multicast PDSCH or PUSCH based on the RB range and the starting RB of the multicast PDSCH or PUSCH.

According to another aspect of the present disclosure, a device is provided, wherein the device includes: a non-transitory memory storage comprising instructions; and one or more processors in communication with the non-transitory memory storage, wherein the one or more processors execute the instructions to: send a resource allocation field to a group of UEs, the resource allocation field indicating a starting resource block (RB) index and an RB range; and transmit or receive data over at least one RB of a set of RBs in a multicast PDSCH or PUSCH with the group of UEs, wherein a set of RBs of the multicast PDSCH or PUSCH are identified based on a starting RB location and the RB range, and the starting RB location is associated with the starting RB index and at least one of a reference RB location or an assigned sub-band.

Optionally, in some embodiments of any of the preceding aspects, the one or more processors execute further instructions to: assign a multicast group identity (ID) a first UE and a second UE of the group UEs, and receive a Cyclic Redundancy Check (CRC) data scrambled by the multicast group ID is attached to a control format from the first UE and the second UE.

Optionally, in some embodiments of any of the preceding aspects, the resource allocation field is signaling based on at least one of: a downlink control information (DCI) for downlink multicast; and a size of the resource allocation field can determined in accordance with any one of a size of a common control resource set (CORESET), a size of an initial downlink BWP, a size of a downlink BWP having a smallest BWP ID among a plurality of downlink BWPs configured for a first UE and a second UE; a size of a default downlink bandwidth part (BWP) configured for the first UE and the second UE; a numerology of a current active BWP; or a downlink component carrier within which a control format is transmitted to the first UE and the second UE; a downlink control information (DCI) for uplink multicast, and wherein a size of the resource allocation field is determined in accordance with a size of an uplink bandwidth part (BWP), the uplink BWP having a smallest BWP ID among a plurality of uplink BWPs configured for the first UE; or a higher-layer parameter indicating a first plurality of reference RBs comprises the (k×N)-th common RB, k being an integer and N being a pre-determined value.

Optionally, in some embodiments of any of the preceding aspects, the common CORESET is a CORESET with CORESET ID #0 within a carrier where the DCI is received.

Optionally, in some embodiments of any of the preceding aspects, the control format is size-matched to a type 1_0 DCI.

Optionally, in some embodiments of any of the preceding aspects, N is a multiple of a configured RB group size or a configured RB bundle size; or N is determined in accordance with a numerology of an active downlink bandwidth part (BWP).

Optionally, in some embodiments of any of the preceding aspects, the reference RB is assigned to the group UEs by a higher layer signaling, and the reference RB comprises a first plurality of reference RBs comprises a set of common RBs, the set of common RBs are configured by higher layers.

Optionally, in some embodiments of any of the preceding aspects, the one or more processors execute further instructions to send a first BWP identifier (ID) indicating a first BWP to a first UE, and a second BWP ID indicating a second BWP to a second UE prior to sending the resource allocation field, and wherein the at least one RB belongs to one of the first BWP and the second BWP.

Optionally, in some embodiments of any of the preceding aspects, the first BWP is different from the second BWP in a same carrier or an aggregation of carriers.

Optionally, in some embodiments of any of the preceding aspects, the at least one RB belonging to the one of the first BWP and the second BWP has a lowest RB index among a first subset of the first plurality of reference RBs, the first subset of the first plurality of reference RBs belonging to the first BWP.

Optionally, in some embodiments of any of the preceding aspects, the set of RBs has a size of one of: an initial downlink bandwidth part (BWP) or an initial uplink BWP configured for a first component carrier; a downlink BWP or an uplink BWP, the downlink BWP or uplink BWP having a smallest BWP ID among a plurality of downlink BWPs or uplink BWPs configured for a first UE within a component carrier; a default downlink bandwidth part (BWP) or a default uplink BWP configured for the first component carrier; or a size in accordance with which a size of the resource allocation field is determined or configured using DCI or a higher layer signaling message.

Optionally, in some embodiments of any of the preceding aspects, the resource allocation field includes a bitmap indicating the at least one RB to be used for the multicast service.

Optionally, in some embodiments of any of the preceding aspects, the at least one RB includes a set of contiguously allocated RBs, and wherein the resource allocation field includes a resource indication value (RIV) corresponding to a starting RB and a length of the set of contiguously allocated RBs.

Optionally, in some embodiments of any of the preceding aspects, the starting RB and the length of the set of contiguously allocated RBs are determined in accordance with the RIV and a scale factor if M is different than N, M being a size of a number of contiguous RBs, N being size in accordance with which a size of the resource allocation field is determined.

According to another aspect of the present disclosure, a device is provided, wherein the device includes: a non-transitory memory storage comprising instructions; and one or more processors in communication with the non-transitory memory storage, wherein the one or more processors execute the instructions to: receive a resource configuration field identifying a multicast bandwidth part (BWP) from a base station, the resource configuration field excluding a BWP ID of the multicast bandwidth part BWP; and transmit or receive multicast data over at least one resource block (RB) of the multicast bandwidth part BWP.

According to another aspect of the present disclosure, a device is provided, wherein the device includes: a non-transitory memory storage comprising instructions; and one or more processors in communication with the non-transitory memory storage, wherein the one or more processors execute the instructions to: transmit a resource configuration field identifying a multicast bandwidth part (BWP) to two or more user equipments (UEs), the resource configuration field excluding a BWP ID of the multicast bandwidth part (BWP); and transmit or receive multicast data over at least one resource block (RB) of the multicast bandwidth part BWP to or from the two or more UEs.

According to another aspect of the present disclosure, a device is provided, wherein the device includes: a non-transitory memory storage comprising instructions; and one or more processors in communication with the non-transitory memory storage, wherein the one or more processors execute the instructions to: receive a downlink control information (DCI) identifying a multicast bandwidth part (BWP) from a base station (BS), the DCI excluding a BWP ID of the multicast bandwidth part BWP; and transmit or receive multicast data over at least one resource block (RB) of the multicast BWP.

According to another aspect of the present disclosure, a device is provided, wherein the device includes: a non-transitory memory storage comprising instructions; and one or more processors in communication with the non-transitory memory storage, wherein the one or more processors execute the instructions to: transmit a downlink control information (DCI) identifying a multicast bandwidth part (BWP) to two or more user equipments (UEs), the DCI excluding a BWP ID of the multicast bandwidth part (BWP); and transmit or receive multicast data over at least one resource block (RB) of the multicast BWP to or from the two or more UEs.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
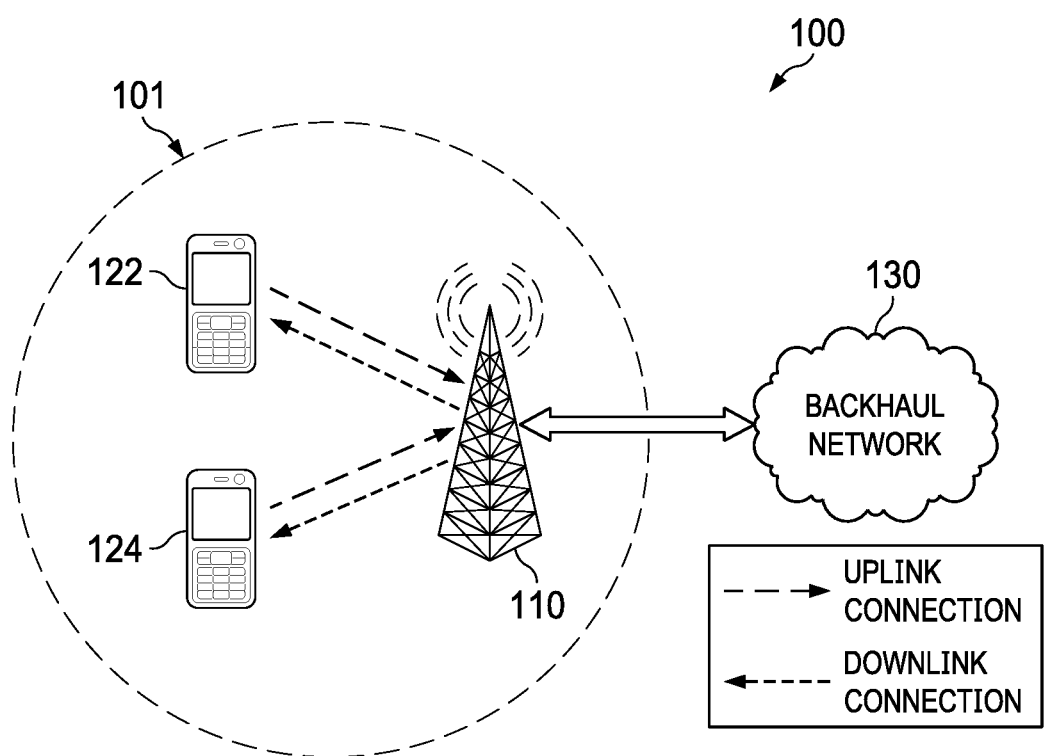
FIG. 1 is a diagram of an embodiment wireless network.

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. It should be appreciated that much of this disclosure describes the inventive aspects of multicast resource allocation within the context of two UEs, but that the disclosed inventive aspects are not so limited, and can easily be extended to groups of three or more UEs.

A multicast DL transmission refers to a scenario where a BS aims to transmit the same data (multicast DL data) to UEs within a group of UEs. In such scenario, the BS transmits a single physical downlink control channel (PDCCH) containing a DCI to schedule a single physical downlink shared channel (PDSCH) containing the multicast data for all the UEs within the group of UEs, and each UE within the group of UEs receives the same DCI and then receives the same multicast DL data within the same PDSCH scheduled by the DCI. A multicast UL transmission refers to a scenario where a BS schedules each UE within a group of UEs to transmit data (which is potentially different from the data of other UEs within the group of UEs) in a physical uplink shared channel (PUSCH) over the same set of UL resources. In particular, the BS transmits a single PDCCH containing a DCI to schedule the same set of UL resources to each UE within the group of UEs, and each UE within the group of UEs receives the same DCI and transmits its own UL data over the same UL resources scheduled by the DCI.

The current scheduling DCI formats in 5G has the following issues/limitations: DCI format 1_0 for DL (or format 0_0 for UL) does not support BWP switching and cross-carrier scheduling. For DCI format 1_1 for DL (or format 0_1 for UL) can support BWP switching and cross-carrier scheduling, however the size of FDRA field of the DCI is based on the size of the active (DL or UL) BWP. Therefore, In order to use DCI format 1_1 or DCI format 0_1 in multicast scenario, the size of the active BWP of each UE in the group of UEs should be the same, which is an undesired limitation in BWP configuration. The invention of this disclosure provides a first solution how to allocate resources for multicast PDSCH or multicast PDSCH to a group of UEs with different active BWPs and different scheduled BWPs, and a second solution how to allocate resources for multicast PDSCH or multicast PUSCH in carrier-aggregation (specially in cross-carrier scheduling). The general concept of the two solutions is to send a multicast DCI to a group of UEs, the multicast DCI indicating a same size of the scheduled PDSCH or PUSCH within the scheduled BWP (i.e. the BWP whose ID is indicated in the DCI) for each UE in the group, for an example, the starting RB of the scheduled PDSCH or PUSCH in the scheduled BWP should be the same for all UEs in the group, and thus, achieve multicast transmission.

Aspects of this disclosure provide an efficient mechanism for signaling multicast resource grants to allow user equipments (UEs) to identify the resource blocks of multicast PDSCH (or multicast PUSCH for UL) allocated for multicast data transmissions based on a combination of the existing DCI formats (No new DCI format) with a new RNTI. For an example, use one of the current non-fallback DCI formats, i.e. DCI 1_1 for DL and 0_1 for UL, together with a new RNTI for multicast (e.g. MC-RNTI), and the RB numbering and RB range details disclosed in some of the following embodiments.

Other aspects of this disclosure provide an efficient mechanism for signaling multicast resource grants to allow UEs to identify the resource blocks of multicast PDSCH (or multicast PUSCH for UL) allocated for multicast data transmissions based on a new DCI format for multicast (i.e. a new DCI format which supports multicast scheduling in any BWP), or a combination of the new DCI format and a new RNTI (with possible size-matching of the new DCI format to DCI 0_0/1_0), and the RB numbering and RB range details disclosed in some of the following embodiments.

In particular, a base station transmits a resource allocation field (also known as frequency domain resource assignment (FDRA) field) to a group of UEs that indicates a set of RBs allocated for multicast transmission. In any of the embodiments described in this disclosure, the RBs indicated by the resource allocation field may be either virtual resource blocks (VRBs) or physical resource blocks (PRBs). Also, the terms resource allocation field and frequency domain resource assignment (FDRA) field are interchangeably used throughout this disclosure. The value of the resource allocation field is used by each UE within the group of UEs to locate the set of RBs allocated for the multicast PDSCH or PUSCH based on at least one of a reference RB location, a reference sub-band, or a multicast bandwidth part (BWP). A multicast BWP may be referred to as a group-common BWP, and both terms are used interchangeably in this disclosure. In one example, resource allocation field indicates a starting RB and an RB range. In one example, resource allocation type 1 may be used for multicast resource allocation, wherein the resource allocation field indicates a resource indication value (RIV) which implicitly indicates a starting RB and an RB range. The starting RB indicated by the resource allocation field is used by the UEs to locate the starting RB of a set of contiguous RBs allocated for the multicast PDSCH or PUSCH based on at least one of a reference RB location, a reference sub-band, or a multicast BWP, and the RB range indicated by the resource allocation field is used by the UEs to identify the ending RB of the set of contiguous RBs allocated for the multicast PDSCH based on the starting RB location. In another example, resource allocation type 0 may be used for multicast resource allocation, wherein the resource allocation field indicates a set of resource block groups (RBGs) using a bitmap wherein the RBs belonging to RBGs corresponding to bit values equal to 1 are allocated for multicast transmission. The bitmap indicated by the resource allocation field is used by the UEs to locate the RBGs of the multicast PDSCH or PUSCH based on at least one of a reference RB location, a reference sub-band, or a multicast BWP. The multicast PDSCH (or PUSCH for UL) may include a common set of RBs with respective bandwidth parts (BWPs) that are scheduled to the UEs. It should be appreciated that BWPs scheduled to different UEs and used for multicast transmission at least partially overlap with one another in the frequency domain, and that the common set of RBs map to frequency domain resources in the overlapping portions of the BWPs. It should further be appreciated that the respective BWPs may be located on the same component carrier or serving cell or on different component carriers or different serving cells. It should be noted that the terms "component carrier", "carrier", and "serving cell" are interchangeably used in this disclosure.

FIG. 1 is a diagram of a wireless network 100 for communicating data. The wireless network 100 includes a base station 110 having a coverage area 101, a plurality of mobile devices 120, and a backhaul network 130. As shown, the base station 110 establishes uplink (dashed line) and/or downlink (dotted line) connections with the user equipments (UEs) 122, 124, which serve to carry data from the UEs 122, 124 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as an evolved NodeB (eNB), a generalized NodeB (gNB), a macro-cell, a femtocell, a Wi-Fi access point (AP), or other wirelessly enabled devices. Base stations may provide wireless access in accordance with one or more wireless communication protocols, e.g., new radio (NR), long term evolution (LTE), LTE advanced (LTE-A), High Speed Packet Access (HSPA), Wi-Fi 802.1a/b/g/n/ac. As used herein, the term "UE" refers to any component (or collection of components) capable of establishing a wireless connection with a base station. The terms "UE," "mobile device," and "mobile station (STA)" are used interchangeably throughout this disclosure. In some embodiments, the network 100 may comprise various other wireless devices, such as relay stations, schedulers, central controllers, and the like.

Figure 2A:
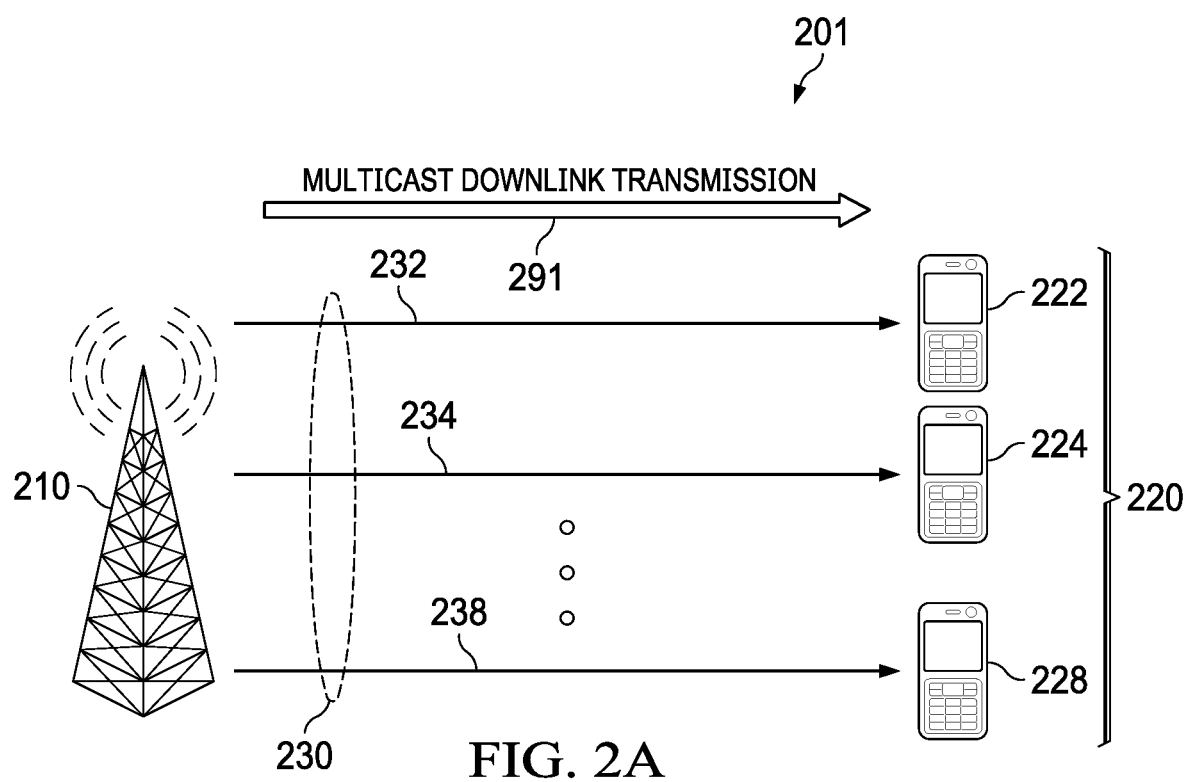
FIGS. 2A-2B are diagrams of multicast transmissions.

In some embodiments, multicast transmissions may be exchanged between base stations and UEs in a wireless network. Multicast transmissions may include downlink multicast transmissions communicated from a base station to UEs in a group of UEs configured for multicast reception. FIG. 2A is a diagram 201 of a multicast downlink transmission 291 from a base station 210 to UEs 222, 224, 228 in a group of UEs 220. Component carrier group 230 includes DL component carriers 232, 234, and 238. In this example, the multicast downlink transmission 291 is communicated over DL component carriers 232, 234, 238, with the UE 222 receiving the multicast downlink transmission 291 over the component carrier 232, the UE 224 receiving the multicast downlink transmission 291 over the component carrier 234, and the UE 228 receiving the multicast downlink transmission 291 over the component carrier 238. The component carriers 232, 234, 238 may be orthogonal or non-orthogonal in the frequency domain. In other examples, multicast downlink transmissions may be communicated to two or more UEs over the same DL component carrier. Here a component carrier refers to the primary carrier accessed by a UE, or any of the primary carrier or secondary carriers configured to a UE in the case of carrier aggregation.

Figure 2B:
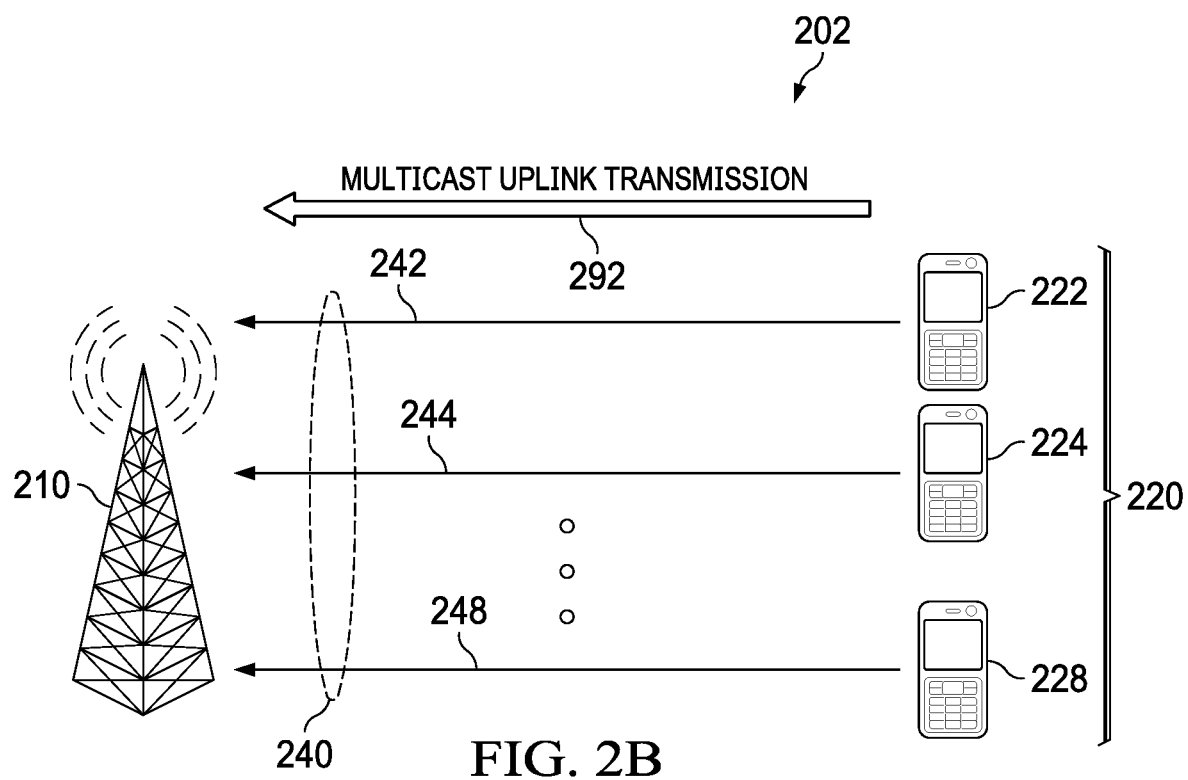

Multicast transmissions may also include uplink multicast transmissions communicated to a base station from UEs in a group of UEs configured for multicast transmission. FIG. 2B illustrates a diagram 202 of a multicast uplink transmission 291 from the UEs 222, 224, 228 to the base station 210. Similar to the multicast downlink transmission 291, the multicast uplink transmission 292 is communicated over UL component carriers 242, 244, 248, with the UE 222 transmitting the multicast uplink transmission 292 over the component carrier 242, the UE 224 transmitting the multicast downlink transmission 292 over the component carrier 244, and the UE 228 transmitting the multicast downlink transmission 292 over the component carrier 248. Component carrier group 240 includes UL component carriers 242, 244, and 248. The component carriers 242, 244, 248 may be orthogonal or non-orthogonal in the frequency domain. In other examples, multicast downlink transmissions may be communicated to two or more UEs over the same UL component carrier.

A multicast UL transmission refers to a scenario where a BS schedules each UE within a group of UEs to transmit data (which is potentially different from the data of other UEs within the group of UEs) in physical uplink shared channel (PUSCH) over the same set of UL resources. In particular, the BS transmits a single PDCCH containing a DCI to schedule one set of UL resources to each UE within the group of UEs, and each UE within the group of UEs receives the same DCI and transmits its own UL data over the same UL resources scheduled by the DCI.

It should be appreciated that any number of UEs may be included in the group of UEs 220, and that any number of component carriers may be included in the groups of component carriers 230 and 240. It should also be appreciated that, in some embodiments, two or more UEs may transmit and/or receive the multicast uplink transmission 292 and/or the multicast downlink transmission 291 over the same component carrier. Other examples are also possible. For instance, the same UE may transmit and/or receive a multicast transmission over different component carriers to provide redundancy in order to achieve improved reliability.

Multicast transmissions may be communicated over portions of band width parts (BWPs) that are assigned for multicast PDSCH (or PUSCH for UL). Aspects of this disclosure signal a resource allocation field in a DCI message to notify UEs of the RBs allocated to the multicast PDSCH or PUSCH.

In some embodiments, the resource allocation field may be used to identify the RBs allocated for a multicast PDSCH/PUSCH based on a reference RB or a combination of a reference RB and a reference size. In some embodiments, RB numbering for multicast resource allocation starts from the reference RB.

The resource allocation field may be included in a downlink control information (DCI) message, which is also called multicast DCI in this disclosure. A multicast DCI message is constructed based on a DCI format which describes bitfields of the multicast DCI message. A multicast DCI message is transmitted to a group of UEs in a physical downlink control channel (PDCCH). Transmission of a multicast DCI message in a PDCCH may involve other step, including appending of cyclic redundancy check (CRC) bits to the multicast DCI message, scrambling of the a radio network temporary identifier (RNTI), and encoding of the resulting bits using a forward error correction (FEC) encoder. In one embodiment, a specific DCI format is used for scheduling multicast PDSCH (also called DL multicast DCI) and/or a specific DCI format is used for scheduling multicast PUSCH (also called UL multicast DCI). In another embodiment, the same DCI format which is used for scheduling other types of PDSCH (or PUSCH) can be used for scheduling multicast PDSCH (or PUSCH). In some embodiments, DL fallback DCI may be used as DL multicast DCI and/or UL fallback DCI may be used as UL multicast DCI. In some embodiments, the DCI 1_0 is used as DL fallback DCI and/or DCI 0_0 is used as fallback UL DCI. In some embodiments, DCI 1_0 may be used as DL multicast PDSCH and/or DCI 0_0 may be used as UL multicast PUSCH.

In some embodiments, a size of the resource allocation field is determined based on frequency size of a common control resource set (CORESET) in a scheduling cell or scheduling carrier. A scheduling cell is a serving cell where the UE receives the PDCCH containing the multicast DCL The PDCCH containing the multicast DCI may be received in an active BWP of the scheduling cell of each UE within a group of UEs for multicast communication. In some embodiments, different UEs within the group of TEs may have different active BWPs and/or different scheduling cells, but they all receive the same PDCCH containing the same multicast DCI message. In some embodiments, the size of the resource allocation field is determined based on frequency size of the CORESET where the multicast DCI message is received by the UE. In some embodiments, the size of the resource allocation field is determined based on frequency size of the CORESET with CORESET ID #0 in the scheduling cell. In some embodiments, the size of the resource allocation field is determined based on the size of an initial DL BWP or the size of an initial UL BWP of the scheduling cell. In some embodiments, the size of the resource allocation field is determined based on the size of DL BWP (or UL BWP) configured in the scheduled serving cell which has the smallest BWP ID or largest BWP ID among the DL BWPs (or UL BWPs) configured in the scheduling cell for a UE. In some embodiments, the size of the resource allocation field is determined based on the size of the default DL BWP (or UL BWP) in the scheduling cell. In some embodiments, the size of the resource allocation field is either a fixed number or a predefined number or a number configured by higher layers. In embodiments where the size of the resource allocation field is configured by higher layers, the size of the resource allocation field can be configured per scheduling cell, or per configured numerology of the scheduling cell, or per configured BWP of the scheduling cell. In embodiments where a UE locates the RBs allocated for multicast transmission based on a reference RB and reference size, in some examples, the size of the resource allocation field is determined based on the reference size. In embodiments where a UE locates the RBs allocated for multicast transmission based on a reference sub-band, in some examples, the size of the resource allocation field is determined based on the sub-band size. In embodiments where a UE locates the RBs allocated for multicast transmission based on a multicast or group-common BWP, in some examples, the size of the resource allocation field is determined based on the size of the multicast or group-common BWP.

Denote by A the size of the resource allocation field and by $N_{size}$ the size based on which the size of the resource allocation field (A) is determined (for examples, $N_{size}$ is any of the sizes described in the embodiments above). In some embodiments, when only resource allocation type 1 is configured for multicast PDSCH or PUSCH, the size of the resource allocation field is equal to $A=\lceil \log_2(N_{size}(N_{size}+1)/2) \rceil$ bits. In some embodiments, when only resource allocation type 0 is configured for multicast PDSCH or PUSCH, the size of the resource allocation field is equal to $A=\lceil(N_{size}+(N_{start} \bmod P))/P\rceil$ bits, where P is the RBG size and $N_{start}$ is the common resource block (CRB) index of the RB where the RB numbering for resource allocation starts from according to any of the embodiments described in this disclosure. In an example, $N_{start}$ is the CRB index of a reference RB used for multicast PDSCH or PUSCH. In another example, $N_{start}$ is the CRB index of the lowest RB of a sub-band used for the multicast PDSCH or PUSCH. In yet another example, $N_{start}$ is the CRB index of the starting RB of a multicast BWP or group-common BWP used for the multicast PDSCH or PUSCH. In some embodiments, when both resource allocation type 0 and resource allocation type 1 are configured for multicast PDSCH or PUSCH, the size of the resource allocation field is equal to $A=\max(\lceil \log_2(N_{size}(N_{size}+1)/2) \rceil, \lceil(N_{size}+(N_{start} \bmod P))/P\rceil)$ bits.

In some embodiments, a multicast DCI includes a BWP ID field to indicate the BWP ID of the scheduled BWP, i.e. a DL BWP which contains the allocated RBs for a multicast PDSCH or an UL BWP which contains the allocated RBs for a multicast PUSCH. In some embodiments, a multicast DCI includes a carrier ID field (CIF) to indicate the scheduled cell or scheduled carrier, i.e. the serving cell or component carrier i.e. a DL carrier which contains the allocated RBs for a multicast PDSCH or an UL carrier which contains the allocated RBs for a multicast PUSCH. In some embodiments, where a CIF is included in the multicast DCI, the scheduled BWP belongs to the scheduled cell.

In some embodiments, an UL multicast DCI may be size-matched to a DL multicast DCL In some embodiments, a DL multicast DCI is size-matched to an UL multicast DCL In some embodiments, a DL multicast DCI is size-matched to an UL multicast DCI if a size of the DL multicast DCI (before size-matching) is smaller than a size of the UL multicast DCI, and/or an UL multicast DCI is size-matched to a DL multicast DCI if a size of the UL multicast DCI (before size-matching) is smaller than a size of the DL multicast DCL In some embodiments, a DL multicast DCI and/or an UL multicast DCI is size-matched to DCI format 1_0 or 0_0. The size-matching of a first DCI format to second DCI format may be done by truncating a number of most significant bits (MSBs) of the first DCI format or a number of MSBs of a particular bitfield (e.g. a resource allocation field) of the first DCI format so that the resulting size is equal to a size of the second DCI format. Alternatively, size-matching of a first DCI format to second DCI format may be done by appending a number of zero bits to MSBs of the first DCI format or to MSBs of a particular bitfield (e.g. a resource allocation field) of the first DCI format so that the resulting size is equal to a size of the second DCI format.

In some embodiment, a specific RNTI for multicast communication, e.g. a multicast RNTI or MC-RNTI, may be used to scramble and/or descramble cyclic redundancy check (CRC) of the multicast DCI message and/or to detect the multicast DCI message. Advantageously, because a single resource allocation field is communicated to a group of UEs, the multicast resource allocations are signaled using less overhead than would otherwise be used if resource allocations were signaled separately.

FIGS. 3A-3D are diagrams of multicast resource allocation schemes 301-304 for signaling multicast resource allocations to UEs 222, 224. In this example, a BWP 332 is assigned or scheduled to UE 222 and a BWP 334 is assigned or scheduled to UE 224. The BWPs 332, 334 may be on the same component carrier (or serving cell) or on different component carriers (or serving cells). As shown, the BWP 332 at least partially overlaps with the BWP 334 in the frequency domain such that a common sequence of contiguous RBs ($RB_0, RB_2, \ldots, RB_8$) belong to both of the BWPs 332, 334.

In each of the multicast resource allocation schemes 301-304, the base station 210 sends a resource allocation field 381-384 to the UEs 222, 224. The resource allocation fields 381-383 indicate a starting RB index and an RB range (implicitly using RIV or explicitly), which are used to identify a set of contiguous RBs allocated for the multicast PDSCH/PUSCH. In some embodiments, the set of contiguous RBs is a set of contiguous VRBs, wherein the starting RB is a starting VRB and the RB range is a VRB range. The resource allocation field 384 indicates a set of RBGs, which are used to identify the RBs allocated for the multicast PDSCH/PUSCH.

The starting RB index indicated by (or derived from the RIV indicated by) the respective resource allocation fields 381-383 is used to identify the starting RB of a set of contiguous RBs allocated for the multicast PDSCH/PUSCH based on the reference RB location 390. The RB range indicated by (or derived from the RIV indicated by) the respective resource allocation fields 381-383 is then used to identify the ending RB of the set of contiguous RBs allocated for the multicast PDSCH/PUSCH based on the identified starting RB of the multicast PDSCH/PUSCH. In some embodiments, the set of contiguous RBs is a set of contiguous VRBs, wherein the starting RB is a starting VRB and the RB range is a VRB range. The RBGs indicated by the resource allocation field 384 are used to identify the RBs allocated for the multicast PDSCH/PUSCH based on the reference RB location 390.

In particular, the resource allocation field 381 indicates (implicitly using RIV or explicitly) a starting RB index of one (starting_RB=1) and an RB range of four (RB_range=4). Upon receiving the resource allocation field 381, the UEs 222, 224 identify the RB 391 (i.e., $RB_1$) as the starting RB of a set of contiguous RBs allocated for the multicast PDSCH/PUSCH because the RB 391 is located one RB from the reference RB 390. The UEs 222, 224 then identify the RB 394 (i.e., $RB_4$) as the ending RB of the set of contiguous RBs allocated for the multicast PDSCH/PUSCH because the RB 394 is located four RBs from the starting RB of the set of contiguous RBs allocated for the multicast PDSCH/PUSCH (i.e., four RBs from the RB 391). In some embodiments, the set of contiguous RBs is a set of contiguous VRBs, wherein the starting RB is a starting VRB and the RB range is a VRB range.

Figure 3A:
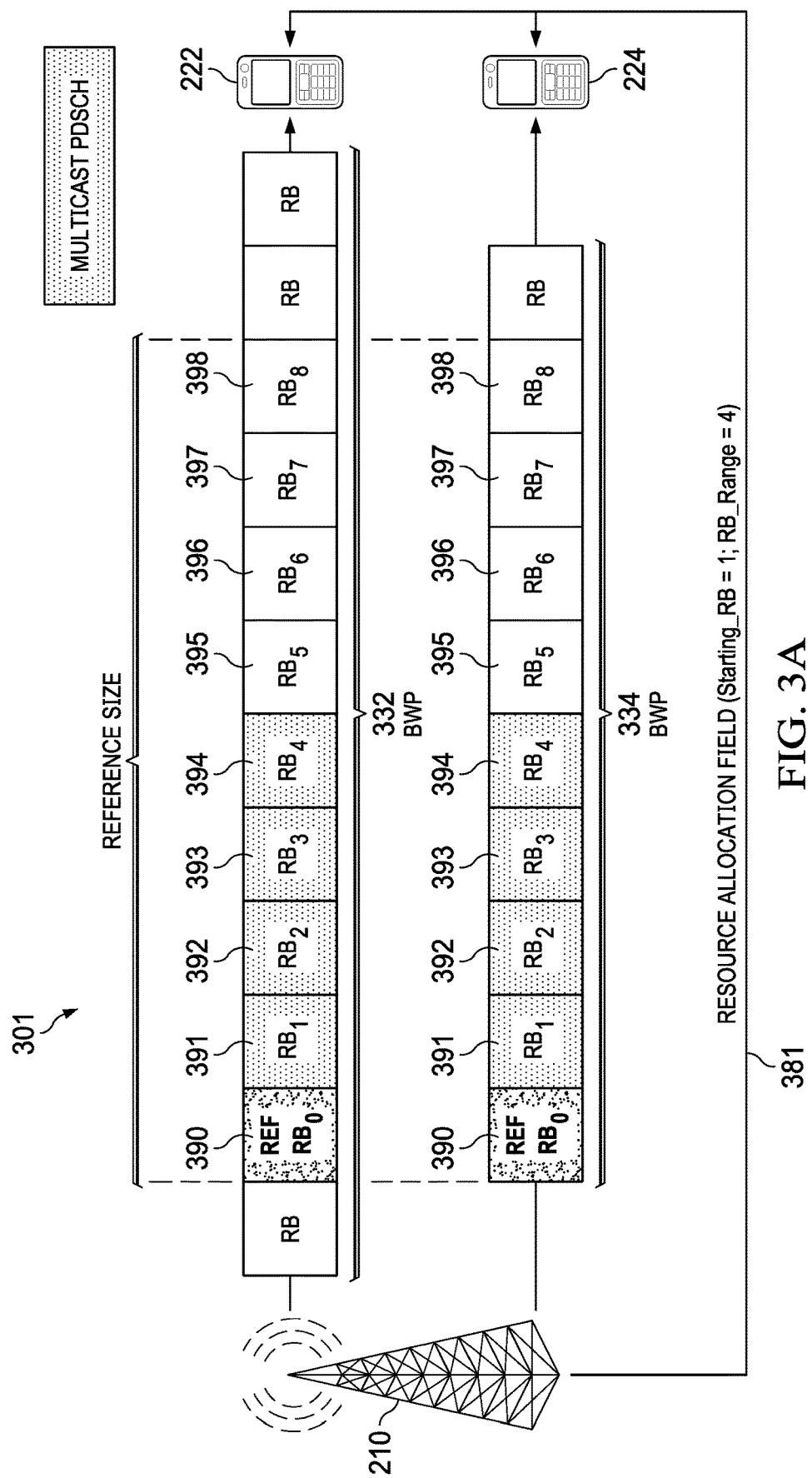
FIGS. 3A-3D are diagrams of embodiment multicast resource allocation schemes for signaling multicast resource allocation fields.
Figure 3B:
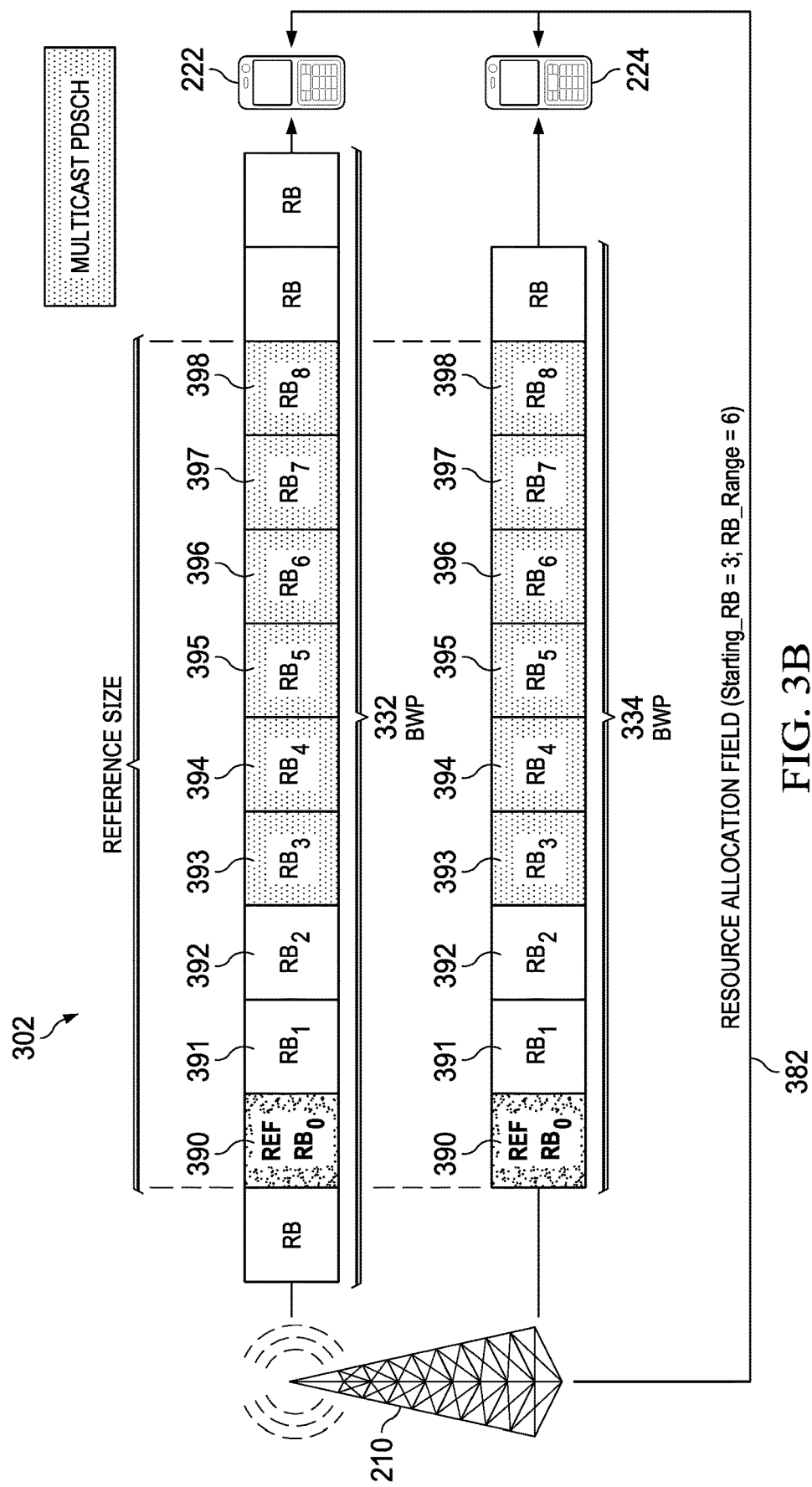

Taking FIG. 3B as a reference, the resource allocation field 382 indicates (implicitly using RIV or explicitly) a starting RB index of three (starting_RB=3) and an RB range of six (RB_range=six). Upon receiving the resource allocation field 382, the UEs 222, 224 identify the RB 393 (i.e., $RB_3$) as the starting RB of a set of contiguous RBs allocated for the multicast PDSCH/PUSCH because the RB 393 is located three RBs from the reference RB 390. The UEs 222, 224 then identify the RB 398 (i.e., $RB_8$) as the ending RB of the set of contiguous RBs allocated for the multicast PDSCH/PUSCH because the RB 398 is located six RBs from the starting RB of the set of contiguous RBs allocated for the multicast PDSCH/PUSCH (i.e., six RBs from the RB 393). In some embodiments, the set of contiguous RBs is a set of contiguous VRBs, wherein the starting RB is a starting VRB and the RB range is a VRB range.

Figure 3C:
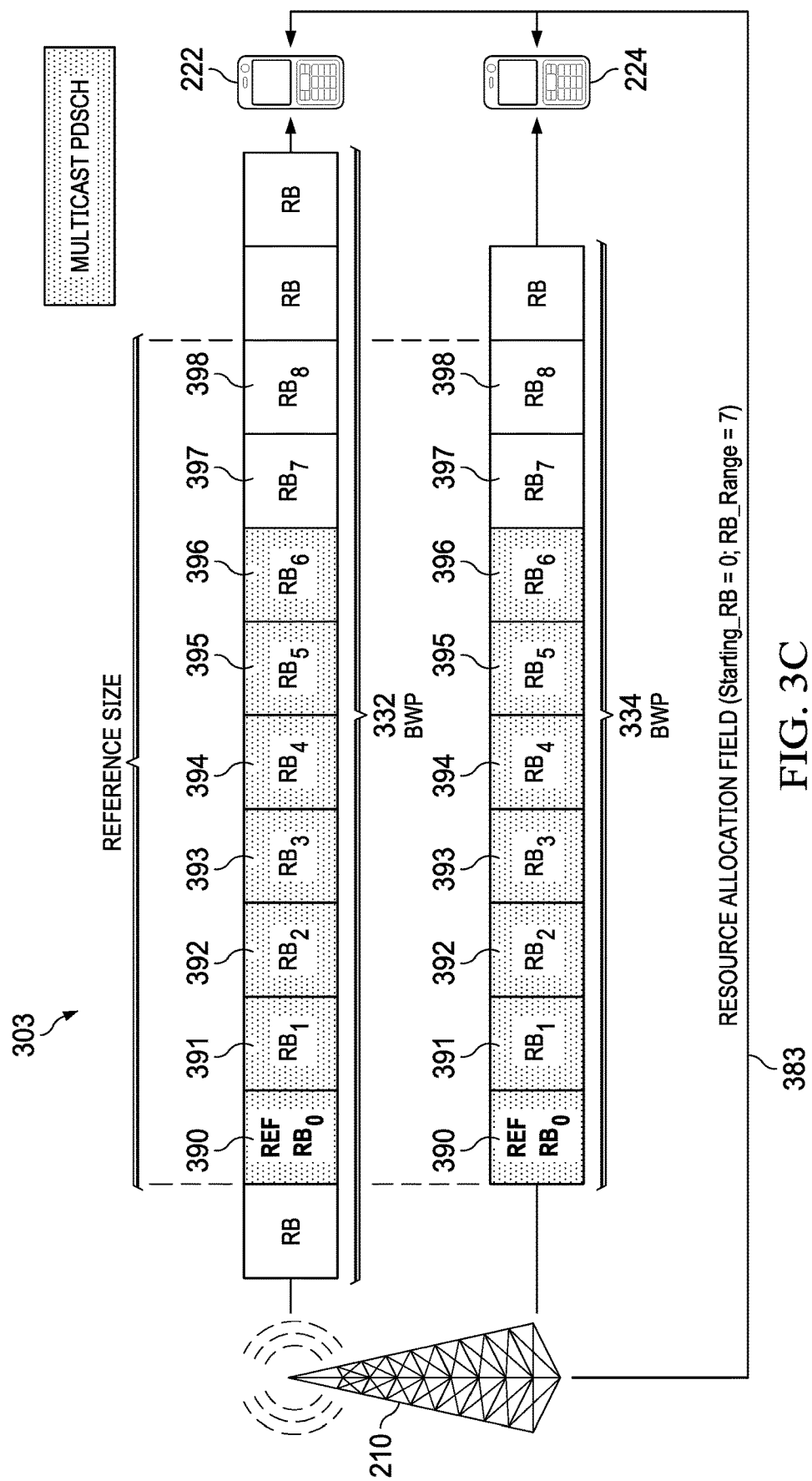

Taking FIG. 3C as a reference, the resource allocation field 383 indicates (implicitly using RIV or explicitly) a starting RB index of zero (starting_RB=0) and an RB range of seven (RB_range=seven). Upon receiving the resource allocation field 383, the UEs 222, 224 identify the RB 390 (i.e., RB) as the starting RB of a set of contiguous RBs allocated for the multicast PDSCH/PUSCH because, when the starting RB is equal to zero, the reference RB is the starting RB. The UEs 222, 224 then identify the RB 396 (i.e., $RB_6$) as the ending RB of the set of contiguous RBs allocated for the multicast PDSCH/PUSCH because the RB 396 is located seven RBs from the starting RB of the set of contiguous RBs allocated for the multicast PDSCH/PUSCH (i.e., seven RBs from the RB 390). In some embodiments, the set of contiguous RBs is a set of contiguous VRBs, wherein the starting RB is a starting VRB and the RB range is a VRB range.

Figure 3D:
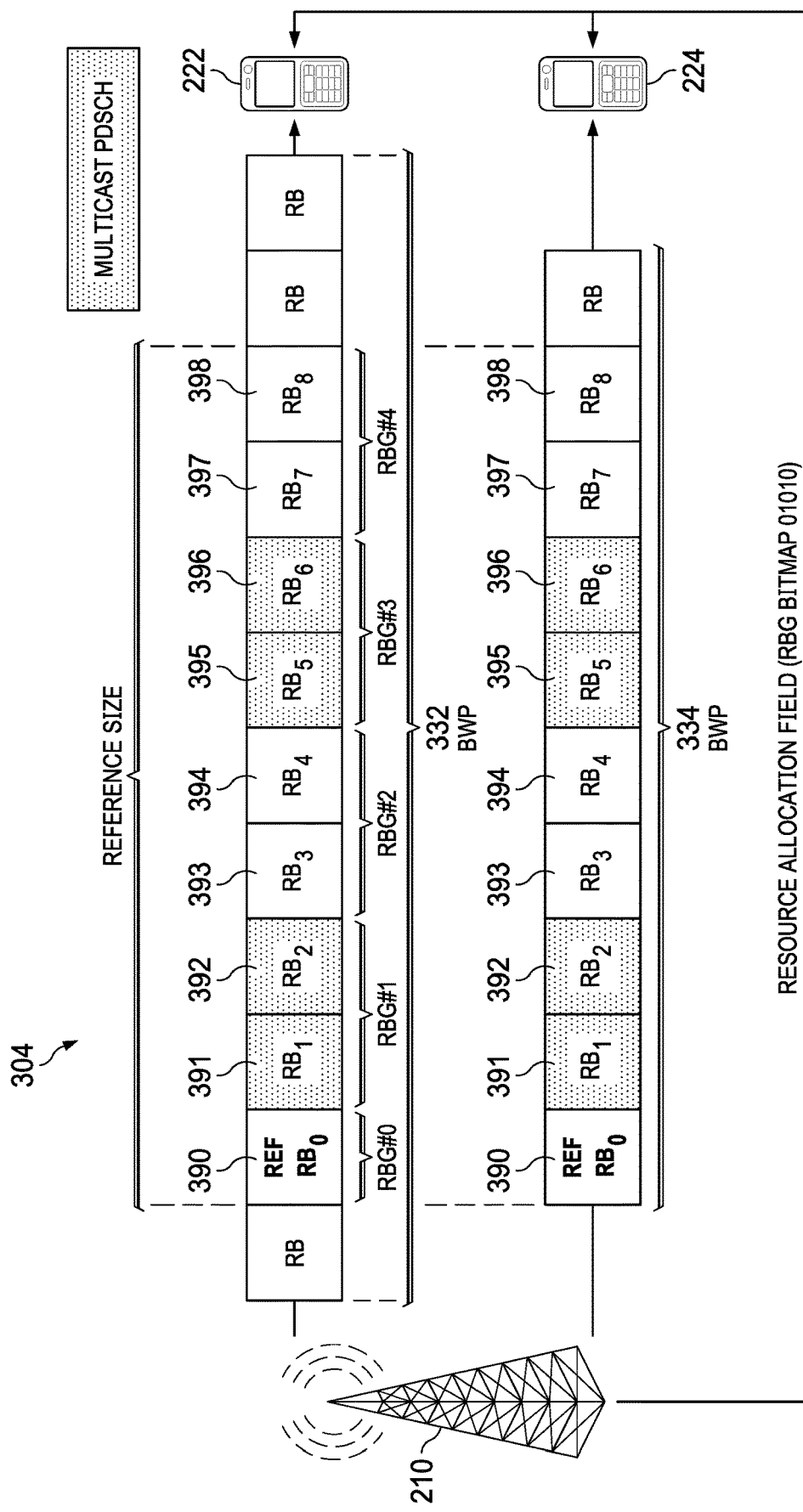
Figure 4A:
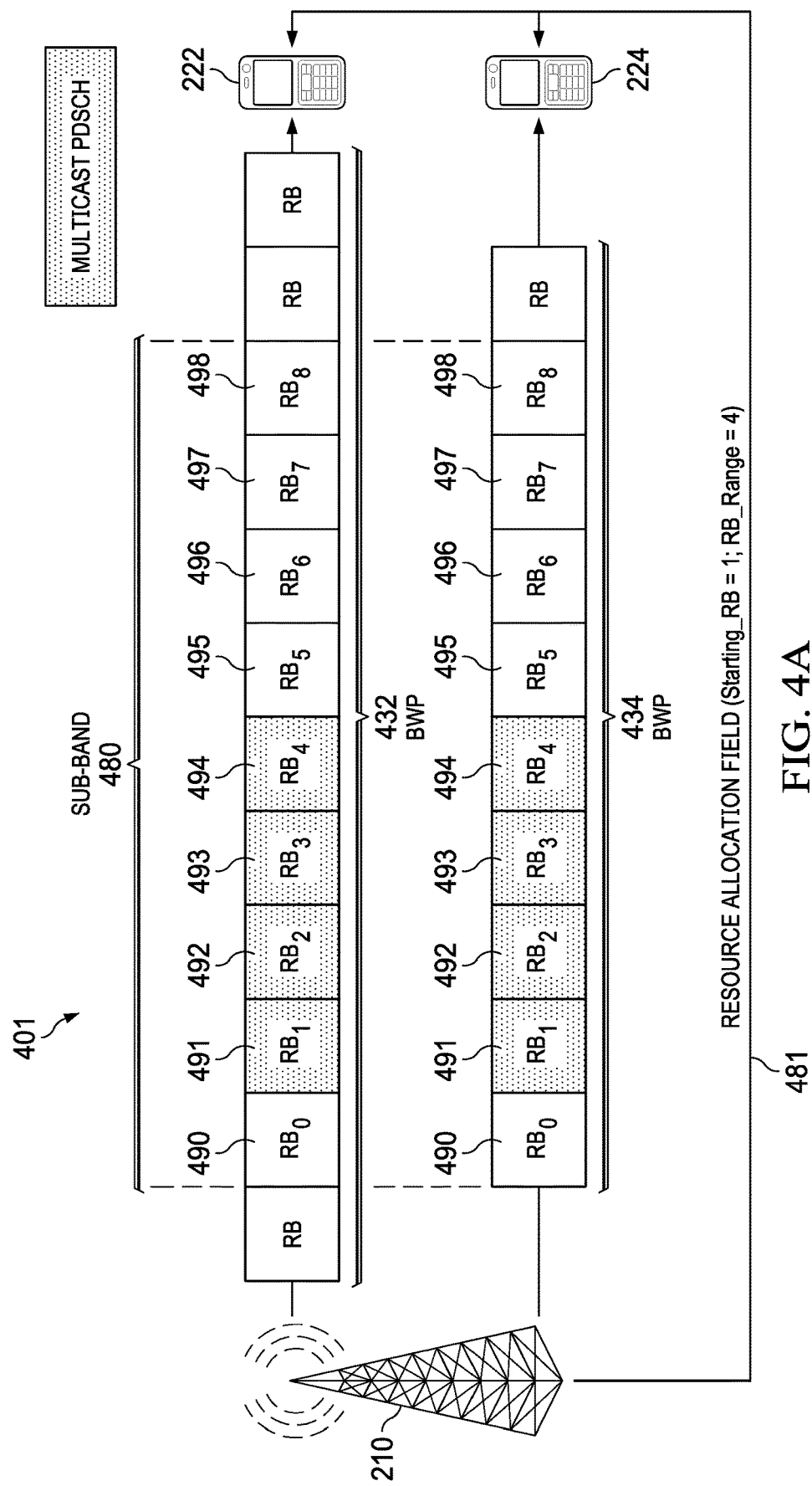
FIGS. 4A-4D are diagrams of additional embodiment multicast resource allocation schemes for signaling multicast resource allocation fields.
Figure 4B:
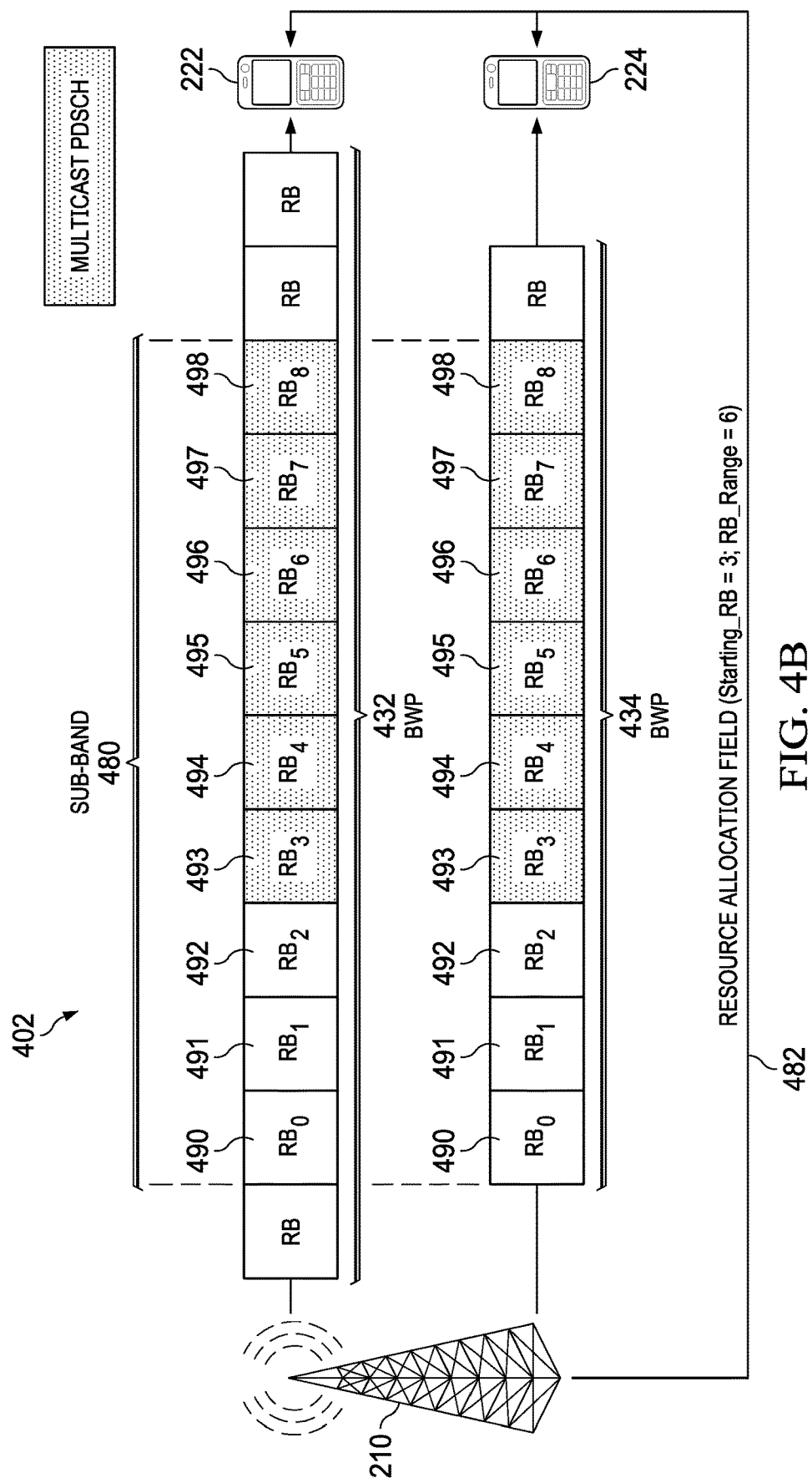
Figure 4C:
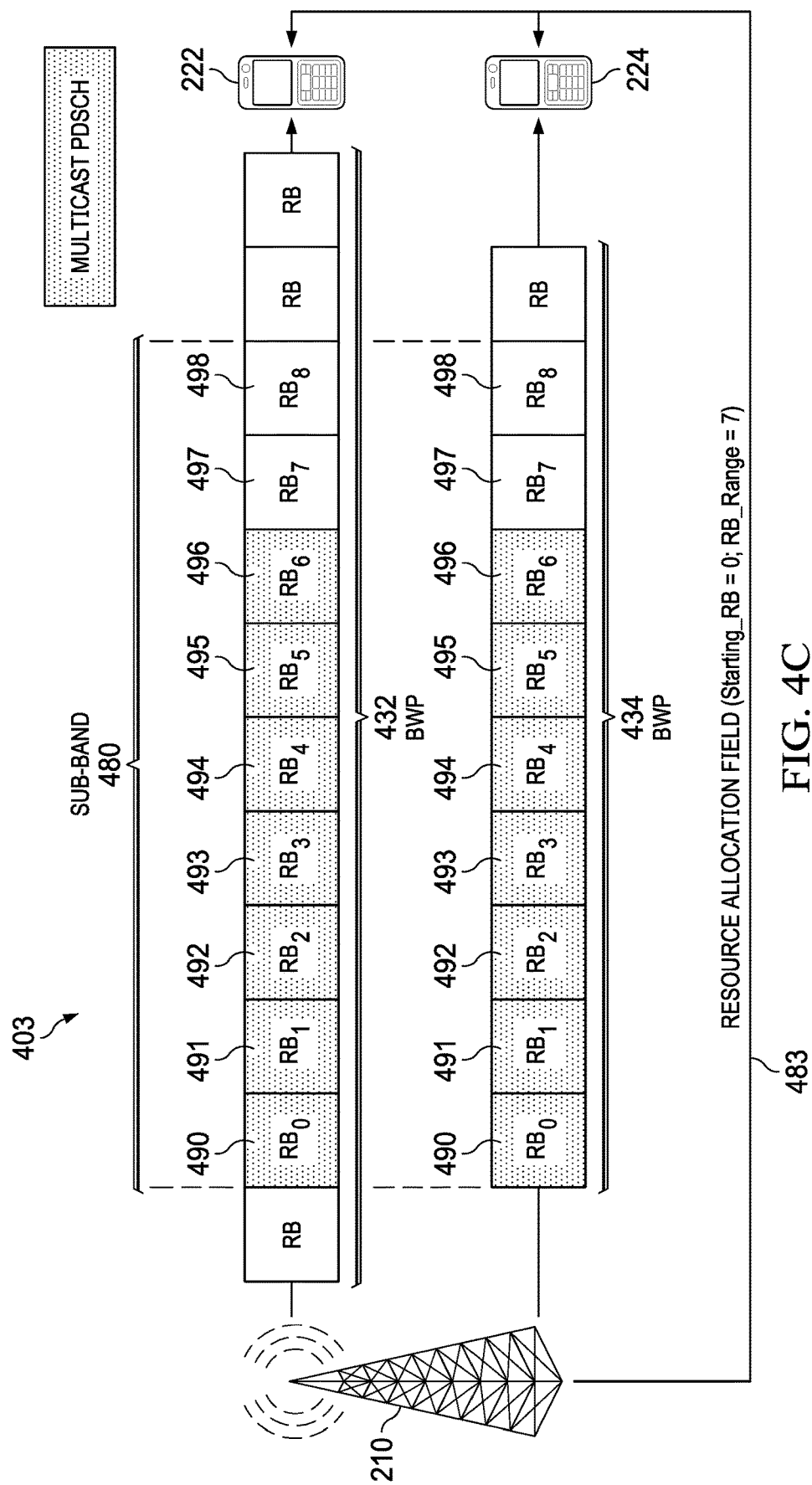
Figure 4D:
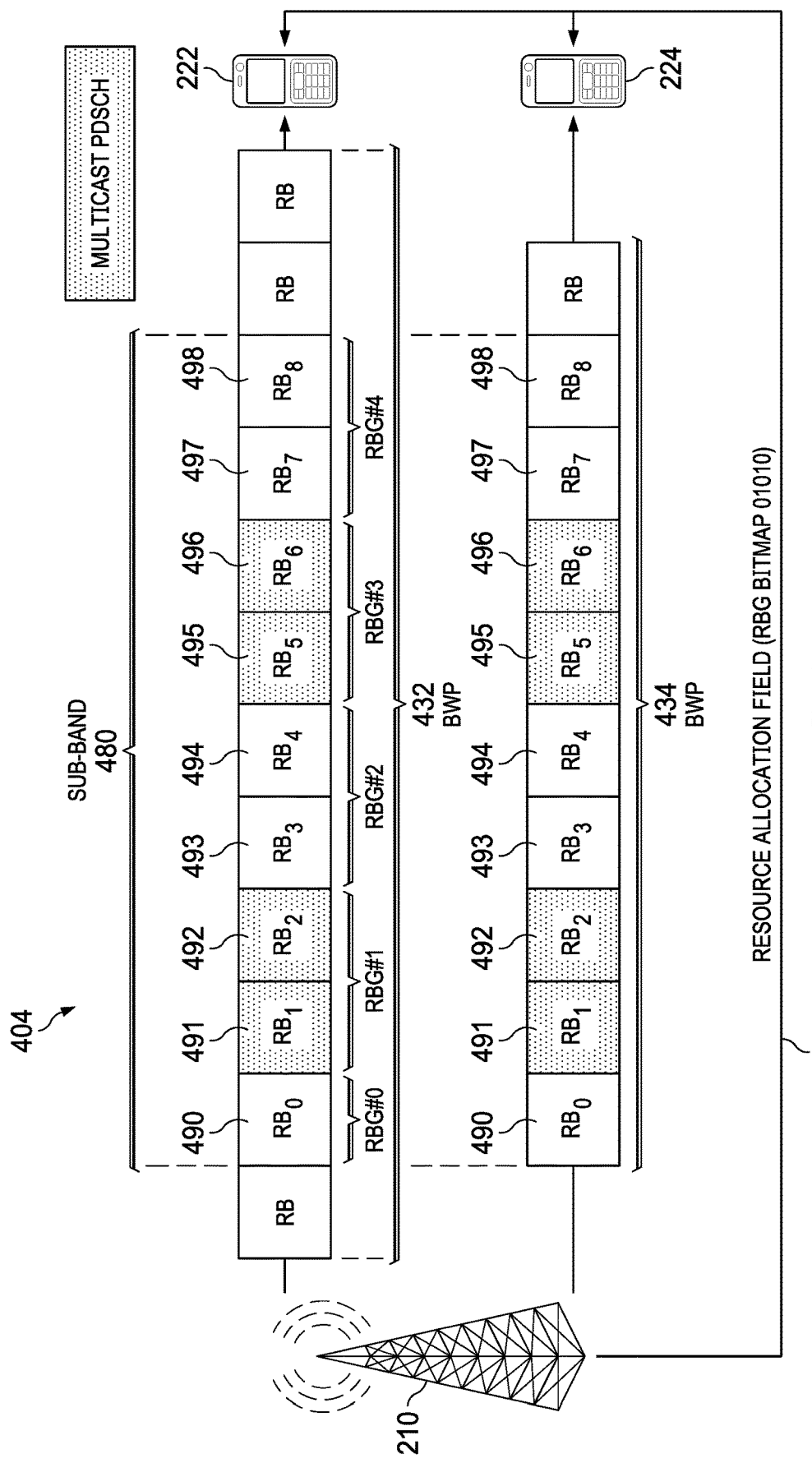
Figure 5:
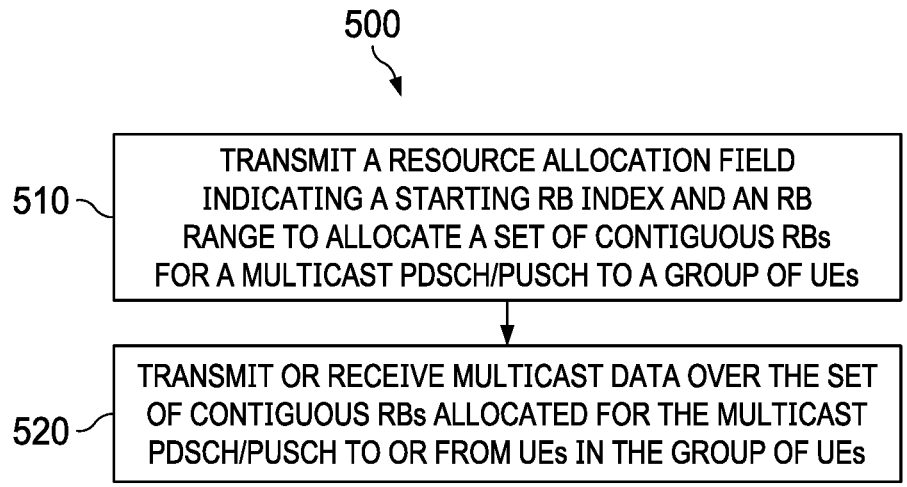
FIG. 5 is a flowchart of a method for multicast service.
Figure 6:
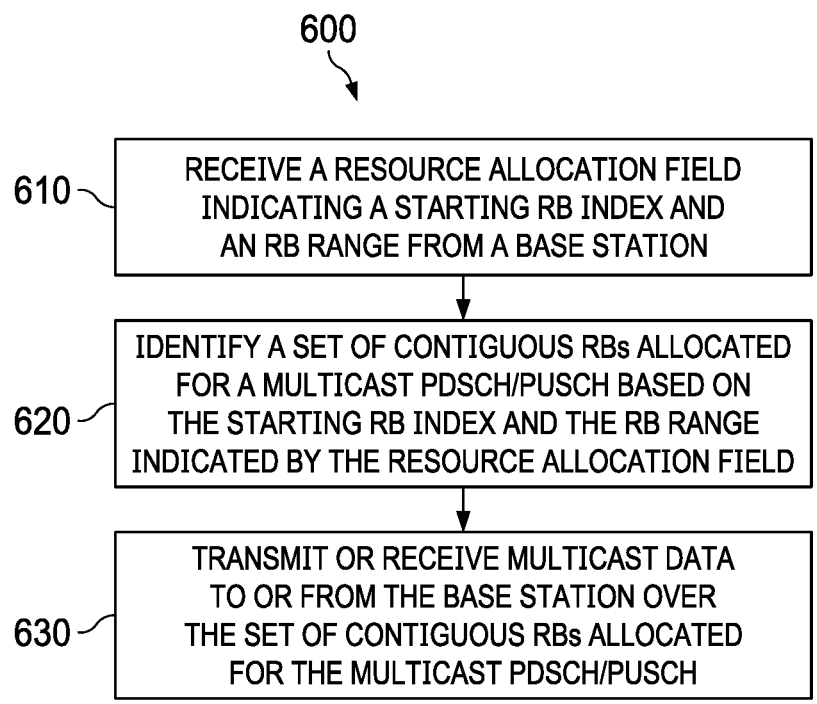
FIG. 6 is a flowchart of another method for multicast service.

Taking FIG. 3D as a reference, the resource allocation field 384 indicates a bitmap of RBGs. In this specific example, the RBG size is equal to 2, i.e. each RBG (except for the first RBG) consists of 2 RBs. The first RBG includes reference RB 390. The second RBG includes RBs 391 and 392. The third RBG includes RBs 393 and 394. The fourth RBG includes RBs 395 and 396. The fifth RBG includes RBs 397 and 398. It should be appreciated that the RBG size can be any other integer value P. In some embodiments, the RBG size can be a power of 2. In some embodiments, the RBG size may be a fixed value, or a predefined value, or a value configured by higher layers, e.g. as part of BWP configuration. Upon receiving the resource allocation field 384, the UEs 222, 224 identify the RBs 391, 392, 395, 396 (i.e., $RB_1$, $RB_2$, $RB_5$, $RB_6$) as RBs allocated for the multicast PDSCH or PUSCH because, the resource allocation field 384 is bitmap (01010) indicating that the second RBG and the fourth RBG are allocated. It should be noted that the first RBG (which includes the reference RB) and/or the last RBG may have a partial size, i.e. they may consist of less than P RBs. This is because RBG boundaries may or may not be aligned with the reference RB.

In some embodiments, any of the above resource allocation fields 381 to 383 can comprise a starting RB and an ending RB to identify a set of RBs. Or other equivalent solutions. The reference RB can be identified by a physical resource block (PRB) index or a common resource block (CRB) index. The reference RB may be a priori information, for an example, predefined to a UE or the group of UEs for multicast communication. In one embodiment, the reference RB is configured using higher layer signaling, e.g. as part of BWP configuration. In another embodiment, the reference RB may be selected from a set of multicast reference RBs. In one embodiment, the reference RB is the lowest reference RB within the set of multicast reference RBs which belongs to the scheduled BWP. In one embodiment, the reference RB from the set of multicast reference RBs is signaled to a UE via a higher layer signaling e.g., a radio resource communications (RRC) signaling, or via a MAC CE signaling or via a DCI message, or a combination thereof. In some embodiments, a subset of the set of multicast reference RBs is first activated using MAC CE or higher layer signaling and a DCI message is used to indicate the reference RB within the activated subset of the set of multicast reference RBs. The DCI message used to indicate the reference RB may be the same DCI massage that is used for scheduling the multicast PDSCH/PUSCH, in which case a separate DCI bitfield in the DCI message may be used for such indication.

In some embodiments, the set of multicast reference RBs consists either of a fixed or predefined set of PRBs or CRBs, or a set of PRBs or CRBs configured by higher layers. In some embodiments, the set of multicast reference RBs consists of CRBs with CRB index k×N, k=0, 1, . . . , within a component carrier, where N can be either of a fixed integer or a predefined integer or an integer configured by higher layers. In embodiments where N is configured by higher layers, N can be configured per serving cell, or per configured numerology of a serving cell, per configured BWP of a serving cell. In some embodiments, N may depend on other higher layer parameters configured to a UE. As an example, N is the RBG size or a fixed integer multiple of the RBG size or a higher-layer configurable integer multiple of the RBG size configured for the scheduled BWP (i.e. the BWP in which the multicast PDSCH F/PUSCH is allocated to be transmitted). As another example, N is the RB bundle size or a fixed integer multiple of the RB bundle size or a higher-layer configurable integer multiple of the RB bundle size configured for the scheduled BWP. As yet another example, for resource allocation type 0, N is the RBG size or a fixed integer multiple of the RBG size or a higher-layer configurable integer multiple of the RBG size configured for the scheduled BWP, and for resource allocation type 1, N is the RB bundle size or a fixed integer multiple of the RB bundle size or a higher-layer configurable integer multiple of the RB bundle size configured for the scheduled BWP.

In some embodiments, a reference size is associated to multicast PDSCH/PUSCH. The reference size may either be a priori information to a UE or a group of UEs for multicast communication or otherwise communicated via higher layer signaling, e.g., RRC signaling, or via MAC CE signaling, or via a DCI message, or a combination thereof. The DCI message that is used for indication of the reference size may be the same DCI massage that is used for scheduling the multicast PDSCH/PUSCH. In some embodiments, the reference size is equal to size $N_{size}$ that is used to determine the size of the multicast resource allocation field. In some embodiments, the reference size is either a fixed number or a predefined number or a number configured by higher layers. In embodiments where the reference size is a configurable integer, the reference size can be configured per serving cell, or per configured numerology of a serving cell, per configured BWP of a serving cell. In some embodiments, the reference size is equal to the size of a common CORESET in the scheduled serving cell (i.e. the serving cell in which or in a BWP of which the multicast PDSCH/PUSCH is allocated to be transmitted). In some embodiments, the reference size is equal to the size of the CORESET with CORESET ID #0 in the scheduled serving cell. In some embodiments, the reference size is equal to the size of the initial DL BWP or the initial UL BWP of the scheduled serving cell. In some embodiments, the reference size is equal to the size of DL BWP (or UL BWP) configured in the scheduled serving cell which has the smallest BWP ID or largest BWP ID among the DL BWPs (or UL BWPs) configured in the scheduled serving cell for a UE. In some embodiments, the reference size is equal to the size of the default DL BWP (or UL BWP) in the scheduled serving cell.

In some embodiments, the resource allocation field may be used to identify the RBs allocated for a multicast PDSCH/PUSCH based on an assigned sub-band, where a sub-band is a set of contiguous RBs within a serving cell which is associated to multicast communication. In some embodiment, RB numbering for multicast resource allocation starts from the lowest RB of the assigned sub-band. The assigned sub-band may be a priori information to a UE or a group of UEs for multicast communication. In some embodiments, the assigned sub-band for multicast transmission is configured using higher layer signaling, e.g. as part of BWP configuration. In some embodiments, a serving cell is divided into a set of sub-bands and the assigned sub-band for multicast transmission is selected from the set of sub-bands. In one example, CRBs of a serving cell are divided into sub-bands of the same size, herein called sub-band size. In one embodiment, the assigned sub-band for multicast transmission is a sub-band (from the set of sub-bands of the scheduled serving cell) which is fully contained in the scheduled BWP and has the lowest sub-band index within the set of sub-bands of the scheduled serving cell. In one embodiment, the assigned sub-band for multicast transmission is indicated to a UE from the set of sub-bands of the scheduled serving cell via a higher layer signaling e.g., a radio resource communications (RRC) signaling, or via a MAC CE signaling or via a DCI message, or a combination thereof. In some embodiments, a subset of the set of sub-bands of the scheduled serving cell is first activated using MAC CE or higher layer signaling and a DCI message is then used to indicate the assigned sub-band for multicast transmission from the activated subset of the set of sub-bands of the scheduled serving cell. The DCI message used to indicate the assigned sub-band for multicast transmission may be the same DCI massage that is used for scheduling the multicast PDSCH/PUSCH, in which case a separate DCI bitfield in the DCI message may be used for such indication.

In some embodiments where the CRBs of a serving cell are divided into sub-bands of the same size (sub-band size), the sub-band size may either be a priori information to a UE or a group of UEs for multicast communication or otherwise communicated via higher layer signaling, e.g., RRC signaling, or via MAC CE signaling, or via a DCI message, or a combination thereof. The DCI message that is used for indication of the sub-band size may be the same DCI massage that is used for scheduling the multicast PDSCH/PUSCH. In some embodiments, the sub-band size is equal to the size $N_{size}$ that is used to determine the size of the multicast resource allocation field. In some embodiments, the sub-band size is either a fixed number or a predefined number or a number configured by higher layers. In embodiments where the sub-band size is a configured by higher layers, the sub-band size can be configured per serving cell, or per configured numerology of a serving cell, per configured BWP of a serving cell. In some embodiments, the sub-band size is equal to the size of a common CORESET in the scheduled serving cell (i.e. the serving cell in which or in a BWP of which the multicast PDSCH/PUSCH is allocated to be transmitted). In some embodiments, the sub-band size is equal to the size of the CORESET with CORESET ID #0 in the scheduled serving cell. In some embodiments, the sub-band size is equal to the size of an initial DL BWP or an initial UL BWP of the scheduled serving cell. In some embodiments, the sub-band size is equal to the size of DL BWP (or UL BWP) configured in the scheduled serving cell which has the smallest BWP ID or largest BWP ID among the DL BWPs (or UL BWPs) configured in the scheduled serving cell for a UE. In some embodiments, the sub-band size is equal to the size of the default DL BWP (or UL BWP) in the scheduled serving cell. In some embodiments, the granularity of the sub-band size is either of one PRB, or one PRG, or one RBG, or one RB bundle, or a higher layer configurable integer number of PRBs.

FIGS. 4A-4D are diagrams of multicast resource allocation schemes 401-403 for signaling multicast resource allocations to UEs 222, 224. Similar to the BWPs 332, 334 in FIGS. 3A-3C, the BWPs 432, 434 are scheduled to the UEs 222, 224 (respectively), and may be on the same component carrier (or serving cell) or on different component carriers (or serving cells). As shown, the BWP 432 at least partially overlaps with the BWP 434 in the frequency domain such that a common sequence of contiguous RBs ($RB_0$, $RB_2$, ..., $RB_8$) belong to both of the BWPs 432, 434.

In each of the multicast resource allocation schemes 401-404 showing in FIG. 4A to 4*d*, the base station 210 sends a resource allocation field 481-484 to the UES 222, 224. Similar to the resource allocation fields 381-383 in FIGS. 3A-3C, the resource allocation fields 481-483 indicate a starting RB index and an RB range (implicitly using RIV or explicitly), and are used to identify a set of contiguous RBs allocated for the multicast PDSCH/PUSCH. However, the starting RB index indicated by (or derived from the RIV indicated by) the resource allocation fields 481-483 is used to identify the starting RB of the set of contiguous RBs allocated for the multicast PDSCH/PUSCH based on the lowest RB of the sub-band 480. Here the lowest RB of the sub-band refers to the starting RB of the sub-band, or equivalently, an RB which has the smallest CRB index in the sub-band. The RB range indicated by (or derived from the RIV indicated by) the respective resource allocation fields 481-483 is then used to identify the ending RB of the set of contiguous RBs allocated for the multicast PDSCH/PUSCH based on the identified starting RB of the set of contiguous RBs allocated for the multicast PDSCH/PUSCH. In some embodiments, the set of contiguous RBs is a set of contiguous VRBs, wherein the starting RB is a starting VRB and the RB range is a VRB range. Similar to the resource allocation field 384 in FIG. 3D, the resource allocation field 484 indicates a bitmap of RBGs, and is used to identify a set of RBs allocated for the multicast PDSCH/PUSCH. Similar to FIG. 3D, in the example of FIG. 4D, the RBG size is equal to 2, i.e. each RBG (except for the first RBG in this example) consists of 2 RBs. The first RBG includes reference RB 490. The second RBG includes RBs 491 and 492. The third RBG includes RBs 493 and 494. The fourth RBG includes RBs 495 and 496. The fifth RBG includes RBs 497 and 498. It should be appreciated that the RBG size can be any other integer value P. In some embodiments, the RBG size can be a power of 2. In some embodiments, the RBG size may be a fixed value, or a predefined value, or a value configured by higher layers, e.g. as part of BWP configuration. It should be noted that the first RBG (which includes the reference RB) and/or the last RBG may have a partial size, i.e. they may consist of less than P RBs. This is because RBG boundaries may or may not be aligned with the reference RB.

Denote by M the reference size for multicast transmission or sub-band size for multicast transmission or the size of the scheduled multicast BWP (according to any of the corresponding embodiments in this disclosure). In some embodiments, if the size $N_{size}$ (which is used for determination of the size of the resource allocation field) is different from M, for resource allocation type 1, a UE first obtains a starting RB index and an RB range from the resource allocation field (e.g. derives a starting RB index and an RB range from the RIV field using $N_{size}$ is the size of the BWP), and then scales the obtained starting RB index and RB range by a factor of max(M/$N_{size}$, 1) rounded down to the nearest power of 2, and then uses the scaled starting RB index and RB range to identify a set of contiguous RBs allocated for the multicast PDSCH/PUSCH based on the reference RB for multicast transmission within the scheduled BWP or based on an assigned sub-band for multicast transmission within the scheduled BWP or based on the scheduled multicast BWP (according to any of the corresponding embodiments in this disclosure In some embodiments, the set of contiguous RBs is a set of contiguous VRBs, wherein the starting RB is a starting VRB and the RB range is a VRB range.

Combing the above 3A to 3D and the FIGS. 4A to 4D, FIG. 5 is a flowchart of a method 500 for multicast service as may be performed by a base station. At step 510, the base station transmits a resource allocation field indicating a starting RB index and an RB range to allocate a set of contiguous RBs for a multicast PDSCH/PUSCH to a group of UEs. The group of UEs can be scheduled with different BWPs or in a carrier-aggregation. At step 520, the base station transmits or receives data from the group of UEs over the set of contiguous RBs allocated for the multicast PDSCH/PUSCH to or from UEs in the group of UEs. In some embodiments, the set of contiguous RBs is a set of contiguous VRBs, wherein the starting RB is a starting VRB and the RB range is a VRB range. The resource allocation field can be any one of the above details showing in 3A to 3D and the FIGS. 4A to 4D.

Combing the above 3A to 3D and the FIGS. 4A to 4D, FIG. 6 is a flowchart of a method 600 for multicast service performed by a UE in a group of UEs configured for multicast transmission/reception. At step 610, the UE receives a resource allocation field indicating a starting RB index and an RB range from a base station. At step 620, the UE identifies a set of contiguous RBs allocated for a multicast PDSCH/PUSCH based on the starting RB index and the RB range indicated by the resource allocation field. At step 630, the UE transmits or receives multicast data to or from the base station over the set of contiguous RBs allocated for the multicast PDSCH/PUSCH in one BWP or group-common BWP. Before the step 610, the UE obtains a reference RB for identifying the set of contiguous RBs (not shown). The reference RB can be predefined or signaling to the UE and the set of contiguous RBs allocated for multicast PDSCH or PUSCH are used for multiple UEs transmitting data to the base station at a same time slot or different time slot. In some embodiments, the set of contiguous RBs is a set of contiguous VRBs, wherein the starting RB is a starting VRB and the RB range is a VRB range.

Figure 7:
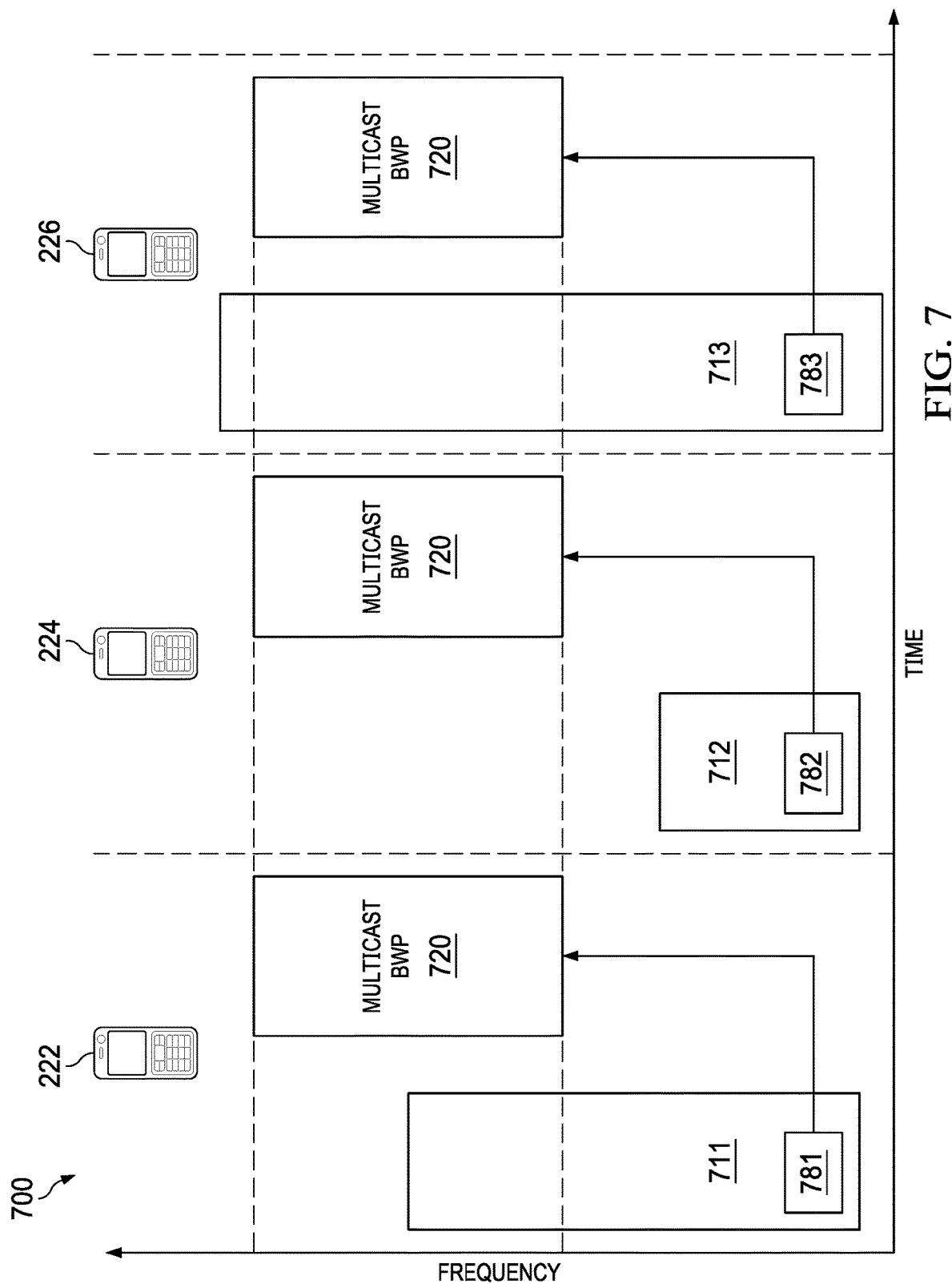
FIG. 7 is a diagram of an embodiment multicast resource allocation scheme for signaling multicast resource allocation fields.

In some embodiments, a multicast DCI message is used to identify a multicast BWP (or group-common BWP) and to identify a set of RBs allocated for a multicast PDSCH/PUSCH within the identified multicast BWP. In some embodiments, RB numbering for multicast resource allocation starts from the lowest RB of the identified multicast BWP. When more than one multicast BWP are configured to a UE or a group of UEs, a BWP ID may be included in the multicast DCI to identify the scheduled multicast BWP among all BWPs configured to a UE or among the multicast BWPs configured to the UE. When only a single multicast BWP is configured to a UE or a group of UEs, the multicast DCI message may identify the scheduled multicast BWP without including a BWP ID. The multicast DCI includes a resource allocation field which indicates a set of RBs allocated for a multicast PDSCH/PUSCH within the scheduled multicast BWP. The resource allocation field may indicate a starting RB index and an RB range (implicitly using an RIV or explicitly), which are used to identify a set of contiguous RBs allocated for the multicast PDSCH/PUSCH within the scheduled multicast BWP. In some embodiments, the set of contiguous RBs is a set of contiguous VRBs, wherein the starting RB is a starting VRB and the RB range is a VRB range. Alternatively, the resource allocation field may use a bitmap to indicate a set of RBGs, which are used to identify the RBs allocated for the multicast PDSCH/PUSCH within the scheduled multicast BWP. FIG. 7 is a diagram of a multicast resource allocation scheme 700 for signaling a multicast DCI message 781, to UEs 222, 224, 226 for scheduling the multicast BWP 720. As shown, the DCI message 781 is communicated within the BWPs 711, 712, 713 which are the active BWPs of UEs 222, 224, 226 respectively, and is used to identify the scheduled multicast BWP 720 and to indicate a set of RBs allocated for a multicast PDSCH/PUSCH within the scheduled multicast BWP 720.

Figure 8:
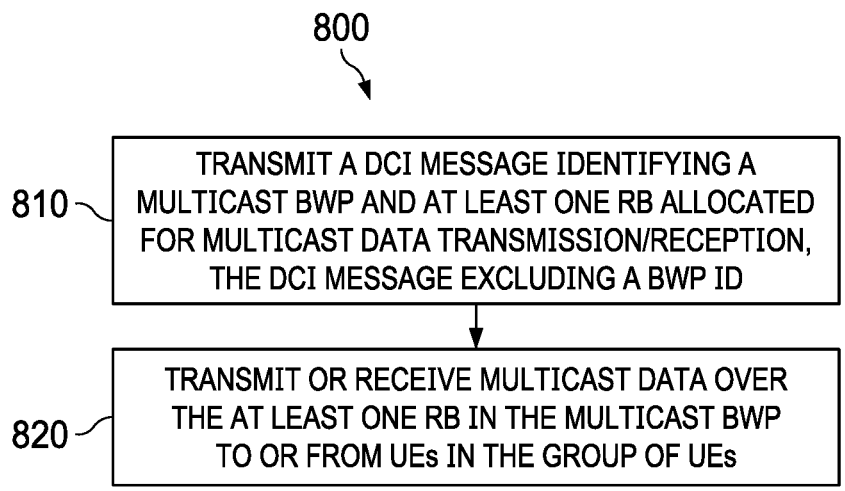
FIG. 8 is a flowchart of a method for multicast service.

FIG. 8 is a flowchart of a method 800 for multicast service as may be performed by a base station. At step 810, the base station transmits a multicast DCI message identifying a multicast BWP and at least one RB allocated for multicast data transmission/reception. In this example, the multicast DCI message excludes a BWP ID. At step 820, the base station transmits or receives multicast data over the at least one RB in the multicast BWP to or from UEs in the group of UEs.

Figure 9:
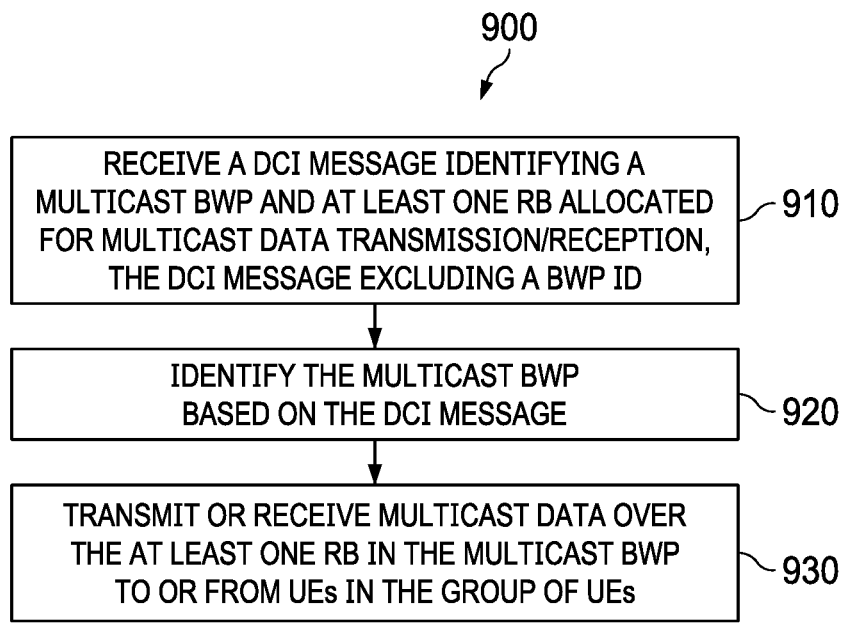
FIG. 9 is a flowchart of another method for multicast service.

FIG. 9 is a flowchart of a method 900 for multicast service performed by a UE in a group of UEs configured for multicast transmission/reception. At step 910, the UE receives a multicast DCI message identifying a multicast BWP and at least one RB allocated for multicast data transmission/reception within the identified multicast BWP, where the multicast DCI message excludes a BWP ID. At step 920, the UE identifies the multicast BWP based on the multicast DCI message. At step 930, the UE transmits or receives multicast data over the at least one RB in the multicast BWP to or from UEs in the group of UEs.

Figure 10:
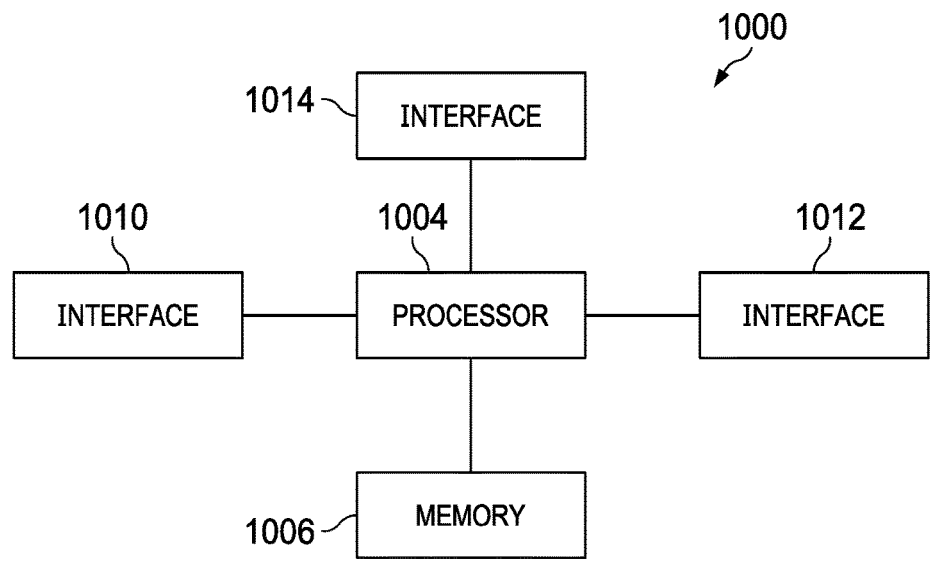
FIG. 10 is a block diagram of an embodiment processing system.

FIG. 10 is a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (DE), a personal computer (PC), a tablet, a wearable communications device (e.g., a smartwatch, etc.), or any other device adapted to access a telecommunications network.

Figure 11:
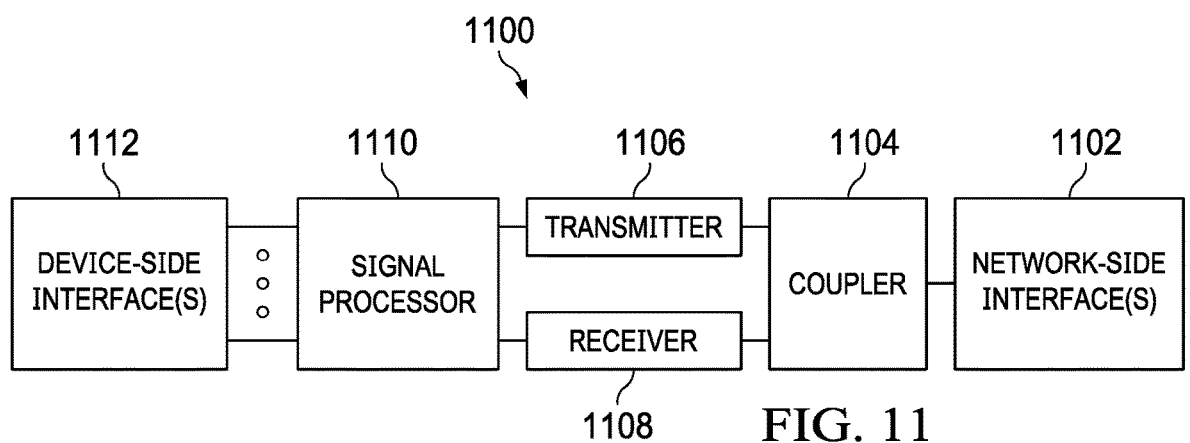
FIG. 11 illustrates a block diagram of a transceiver.

In some embodiments, one or more of the interfaces 1010, 1012, 1014 connects the processing system 1000 to a transceiver adapted to transmit and receive signaling over the telecommunications network. FIG. 11 is a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 11o8 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an identifying unit/module and/or a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for a multicast service, the method comprising:
receiving, by a user equipment (UE), a resource allocation field from a base station (BS), the resource allocation field indicating a starting resource block (RB) index of a multicast frequency region and a length of the multicast frequency region, the multicast frequency region including a set of contiguous RBs allocated for a multicast physical downlink shared channel (PDSCH) or a multicast physical uplink shared channel (PUSCH), the multicast frequency region located within a dedicated bandwidth part (BWP) assigned to the UE;
determining, by the UE, the multicast frequency region based on the resource allocation field and in accordance with a multicast radio network temporary identifier (RNTI), the multicast RNTI being different from an RNTI for a non-multicast service; and
transmitting or receiving, by the UE, data over at least one RB of the set of contiguous RBs.

2. The method of claim 1, wherein the resource allocation field is included in a downlink control format (DCI) message that supports multicast scheduling.

3. The method of claim 1, wherein a cyclic redundancy check (CRC) of the DCI message is scrambled using the multicast RNTI.

4. The method of claim 1, wherein determining the multicast frequency region comprises:
locating a starting RB of the multicast frequency region based on the starting RB index and a reference RB location; and
locating an ending RB of the multicast frequency region based on the length and the starting RB.

5. The method of claim 4, wherein the reference RB location is assigned to the UE by a higher layer signaling.

6. A method for a multicast service, the method comprising:
assigning, by a base station (BS), a multicast radio network temporary identifier (RNTI) to a first UE and a second UE of a group of UEs, the multicast RNTI being different from an RNTI for a non-multicast service;
sending, the BS, a resource allocation field to the group of UEs, the resource allocation field indicating a starting resource block (RB) index of a multicast frequency region and a length of the multicast frequency region, the multicast frequency region including a set of contiguous RBs allocated for a multicast physical downlink shared channel (PDSCH) or a multicast physical uplink shared channel (PUSCH), located within a dedicated bandwidth part (BWP) assigned to one of the group of UEs; and
transmitting or receiving, by the BS, data over at least one RB of the multicast frequency region with the group of UEs.

7. The method of claim 6, wherein the resource allocation field is included in a downlink control format (DCI) message that supports multicast scheduling.

8. The method of claim 7, further comprising:
constructing, by the BS, the DCI message and a cyclic redundancy check (CRC) of the DCI message; and
scrambling, by the BS, the CRC using the multicast RNTI.

9. The method of claim 6, wherein the set of contiguous RBs is identified based on a starting RB location and the length, and wherein the starting RB location is associated with the starting RB index and a reference RB location.

10. The method of claim 9, wherein the reference RB location is assigned to the group of UEs by a higher layer signaling.

11. The method of claim 6, the method further comprising:
sending, by the BS, a BWP identifier (ID) field indicating a first dedicated BWP to the first UE and a second dedicated BWP to the second UE, and wherein the at least one RB belongs to one of the first dedicated BWP and the second dedicated BWP.

12. The method of claim 11, wherein the at least one RB belonging to the one of the first dedicated BWP and the second dedicated BWP has a lowest RB index among a first subset of a plurality of reference RBs, the first subset of the plurality of reference RBs belonging to the first dedicated BWP.

13. A device comprising:
a non-transitory memory storage comprising instructions; and
one or more processors in communication with the non-transitory memory storage, wherein the one or more processors execute the instructions to:
receive a resource allocation field from a base station (BS), the resource allocation field indicating a starting resource block (RB) index of a multicast frequency region and a length of the multicast frequency region, the multicast frequency region including a set of contiguous RBs allocated for a multicast physical downlink shared channel (PDSCH) or a multicast physical uplink shared channel (PUSCH), the multicast frequency region located within a dedicated bandwidth part (BWP) assigned to the device;
determine the multicast frequency region based on the resource allocation field and in accordance with a multicast radio network temporary identifier (RNTI), the multicast RNTI being different from an RNTI for a non-multicast service; and
transmit or receive data over at least one RB of the set of contiguous RBs.

14. The device of claim 13, wherein the resource allocation field is included in a downlink control format (DCI) message that supports multicast scheduling.

15. The device of claim 14, wherein a cyclic redundancy check (CRC) of the DCI message is scrambled using the multicast RNTI.

16. The device of claim 13, wherein the instructions to determine the multicast frequency region comprise instructions to:
locate a starting RB of the multicast frequency region based on the starting RB index and a reference RB location, the reference RB location assigned to the device by a higher layer signaling; and
locate an ending RB of the multicast frequency region based on the length and the starting RB.

17. A device comprising:
a non-transitory memory storage comprising instructions; and
one or more processors in communication with the non-transitory memory storage, wherein the one or more processors execute the instructions to:
assign a multicast radio network temporary identifier (RNTI) to a first UE and a second UE of a group of UEs, the multicast RNTI being different from an RNTI for a non-multicast service;
send a resource allocation field to the group of UEs, the resource allocation field indicating a starting resource block (RB) index of a multicast frequency region and a length of the multicast frequency region, the multicast frequency region including a set of contiguous RBs allocated for a multicast physical downlink shared channel (PDSCH) or physical uplink shared channel (PUSCH), located within a dedicated bandwidth part (BWP) assigned to one of the group of UEs; and
transmit or receive data over at least one RB of the multicast frequency region.

18. The device of claim 17, wherein the resource allocation field is included in a downlink control format (DCI) message that supports multicast scheduling.

19. The device of claim 18, wherein the one or more processors execute further instructions to:
construct the DCI message and a cyclic redundancy check (CRC) of the DCI message; and
scramble the CRC using the multicast RNTI.

20. The device of claim 17, wherein the one or more processors execute further instructions to:
send a BWP identifier (ID) field indicating a first dedicated BWP to the first UE and a second dedicated BWP to the second UE, wherein the at least one RB belongs to one of the first dedicated BWP and the second dedicated BWP.

* * * * *

UNITED STATES PATENT AND TRADEMARK OFFICE
CERTIFICATE OF CORRECTION

| | | |
|---|---|---|
| PATENT NO. | : 11,832,089 B2 | Page 1 of 1 |
| APPLICATION NO. | : 17/349184 | |
| DATED | : November 28, 2023 | |
| INVENTOR(S) | : Abdoli et al. | |

It is certified that error appears in the above-identified patent and that said Letters Patent is hereby corrected as shown below:

In the Claims

In Column 21, in Claim 6, Line 52, delete "the BS," and insert -- by the BS, --.

Signed and Sealed this
Thirtieth Day of January, 2024

Katherine Kelly Vidal
*Director of the United States Patent and Trademark Office*